(12) United States Patent
Yamashita et al.

(10) Patent No.: US 7,986,389 B2
(45) Date of Patent: Jul. 26, 2011

(54) ADHESIVE COMPOSITION FOR OPTICAL FILTER, ADHESIVE LAYER HAVING OPTICAL FILTER FUNCTIONS AND COMPOSITE FILTER

(75) Inventors: Yudai Yamashita, Tokyo-to (JP); Hideki Imamura, Tokyo-to (JP); Yuka Hiwatashi, Tokyo-to (JP); Toshio Yoshihara, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 72 days.

(21) Appl. No.: 12/280,579

(22) PCT Filed: Jun. 28, 2007

(86) PCT No.: PCT/JP2007/063021
§ 371 (c)(1),
(2), (4) Date: Aug. 25, 2008

(87) PCT Pub. No.: WO2008/001856
PCT Pub. Date: Jan. 3, 2008

(65) Prior Publication Data
US 2009/0002620 A1    Jan. 1, 2009

(30) Foreign Application Priority Data

Jun. 29, 2006 (JP) .................................. 2006-179658
Sep. 27, 2006 (JP) .................................. 2006-261921

(51) Int. Cl.
*G02B 6/00* (2006.01)
*G02F 1/1335* (2006.01)
*G02F 1/1337* (2006.01)

(52) U.S. Cl. .................. 349/137; 349/125; 385/141
(58) Field of Classification Search .................. 349/137, 349/125; 385/141
See application file for complete search history.

(56) References Cited

U.S. PATENT DOCUMENTS

| 6,157,504 | A  | * | 12/2000 | Yamada et al. | 359/885 |
| 6,307,671 | B1 | * | 10/2001 | Yabuki | 359/361 |
| 6,309,564 | B1 | * | 10/2001 | Harada et al. | 252/587 |

(Continued)

FOREIGN PATENT DOCUMENTS

JP    10-75087    3/1998

(Continued)

OTHER PUBLICATIONS

International Search Report: PCT/JP2007/063021.

*Primary Examiner* — K. Cyrus Kianni
(74) *Attorney, Agent, or Firm* — Ladas & Parry LLP

(57) ABSTRACT

An adhesive layer attaining, in a single layer, both adhesiveness permitting direct attachment to a glass plate disposed on the front face of a display device and desired optical filter functions and hardly undergoing the change in spectral characteristics attributable to deterioration in a light absorbing agent, even during long-time use, particularly at high temperature under high humidity, as well as a composite filter using this adhesive layer. The adhesive layer has optical filter functions, containing a block copolymer having at least a specific triblock structure in its molecule and having a weight-average molecular weight of 50,000 or more and a molecular-weight distribution (Mw/Mn) of less than 1.5 and one or more light absorbing agents each having light absorption in a predetermined wavelength region, as well as a composite filter using this adhesive layer.

9 Claims, 3 Drawing Sheets

U.S. PATENT DOCUMENTS

| | | | |
|---|---|---|---|
| 6,515,811 B2 * | 2/2003 | Ikuhara et al. | 359/885 |
| 6,586,057 B1 * | 7/2003 | Yabuki | 428/1.1 |
| 6,680,009 B2 * | 1/2004 | Harada et al. | 252/587 |
| 6,875,512 B2 * | 4/2005 | Yabuki | 428/411.1 |
| 7,108,918 B2 * | 9/2006 | Yabuki | 428/411.1 |
| 2001/0053034 A1 * | 12/2001 | Ikuhara et al. | 359/885 |
| 2002/0017636 A1 * | 2/2002 | Harada et al. | 252/582 |
| 2002/0050783 A1 * | 5/2002 | Kubota et al. | 313/495 |
| 2002/0171606 A1 * | 11/2002 | Yabuki | 345/37 |
| 2005/0151454 A1 * | 7/2005 | Yabuki | 313/112 |
| 2007/0259148 A1 * | 11/2007 | Miyako | 428/40.1 |
| 2008/0125524 A1 * | 5/2008 | Ishida et al. | 524/104 |

FOREIGN PATENT DOCUMENTS

| | | |
|---|---|---|
| JP | 11-126024 | 5/1999 |
| JP | 2001-210988 | 8/2001 |
| JP | 2002-260539 | 9/2002 |
| JP | 2005-107199 | 4/2005 |
| JP | 2005-307063 | 11/2005 |
| JP | 2007-84658 | 4/2007 |
| JP | 2007-177102 | 7/2007 |
| JP | 2007-231067 | 9/2007 |

* cited by examiner

ADHESIVE COMPOSITION FOR OPTICAL FILTER, ADHESIVE LAYER HAVING OPTICAL FILTER FUNCTIONS AND COMPOSITE FILTER

TECHNICAL FIELD

The present invention relates to an adhesive layer disposed on the front face of a display device and cutting off an unnecessary light emitted from the display device and capable of regulating a color tone, an adhesive composition for optical filter suitable for formation of the adhesive layer, and a composite filter for a display device using the adhesive layer.

BACKGROUND ART

In recent years, display devices such as cathode ray tubes (CRTs), liquid crystal displays (LCDs), plasma displays (PDPs), organic/inorganic EL displays, field emission displays (FEDs) are used as display devices in various electronics devices.

On the front face of such a display device, an optical filter is disposed for making display colors vivid by removing unnecessary emission components. For example, the plasma displays are those wherein a mixed gas of xenon and neon is excited by discharge to emit a vacuum ultraviolet light, and the emission of lights from red, blue and green fluorescence substances excited by the vacuum ultra violet light is utilized to obtain the three primary colors emission. In these plasma displays, neon atoms are excited and, upon returning to the ground state, emit a neon orange light around 590 nm (also referred to hereinafter as Ne light); therefore, there is a disadvantage that its orange color is mixed with a red color thus failing to achieve a vivid red color. On the other hand, when xenon atoms are excited and then return to the ground state, a near-infrared light in the vicinity of 800 to 1100 nm (also referred to hereinafter as NIR) is generated in addition to ultra violet light, and the generated near-infrared light causes peripheral devices to malfunction. In a plasma display, therefore, a filter having a function of absorbing and eliminating neon orange light and near-infrared light, for example, a filter that locally reduces the transmittance of a neon orange light and near-infrared light, is disposed on the front face of the display. The filter may also be endowed with a function of correcting the color balance of an image or of improving color purity by regulating transmittance in the visible light wavelength region. A filter for realizing a variety of these filter functions, particularly a NIR absorption filter, has a problem that a dye contained therein is easily deteriorated with ultra violet light (also referred to hereinafter as UV) derived from sunlight etc. For solving this problem, a UV absorption function is also required in some cases.

With advanced functions and widespread use of electric/electronics devices, electromagnetic interference (EMI) is increased, and electromagnetic waves are generated even from the above-mentioned display devices such as PDPs. Accordingly, an electromagnetic wave shielding sheet (electromagnetic wave shielding filter) having an electromagnetic wave shielding function is usually disposed on the front face of PDP or the like. The performance of shielding electromagnetic waves generated from the front face of PDP requires a capability of 30 dB or more in 30 MHz to 1 GHz. In this specification, the term "electromagnetic wave" is used to mean electromagnetic waves not higher than a frequency band in the range of MHz to GHz and is used in distinction from infrared light, visible light and ultra violet light.

The electromagnetic wave shielding sheet used in such application requires not only electromagnetic wave shielding performance but also light permeability. The known electromagnetic wave shielding sheet is, therefore, an electroconductive mesh layer obtained by etching a metallic foil (e.g., a copper foil) attached via an adhesive to a transparent substrate film consisting of a resin film.

As the front filter disposed on the front face of a display, a composite filter in which a NIR absorption function, a Ne light absorption function, a color correction function and a UV absorption function are unified together with an electromagnetic wave shielding function is often used.

For example, Patent Documents 1 and 2 have proposed a composite filter comprising an electroconductive mesh layer and an adhesive layer for attachment of a display, formed in this order on one side of a transparent substrate film, and a NIR absorption filter film and the like laminated on the other side of the transparent substrate film.

Patent Document 3 has proposed a composite filter produced by laminating a metallic foil via an adhesive layer on one side of a transparent substrate film, etching the metallic foil for use as an electroconductive mesh layer, and adding a NIR absorption dye to an adhesive layer for attachment to a display, or adding, to the backside thereof, a resin layer to which a NIR absorption dye was added.

Patent Document 4 describes an acrylic block copolymer composition characterized by: (i) comprising a block copolymer (I) having, in its molecule, at least a triblock structure wherein one polymer block (A1) based on acrylic ester units, and two polymer blocks (B1) different in structure from the polymer block (A1) and based on (meth)acrylic ester units, are bound to one another, or a triblock structure wherein two polymer blocks (A1) comprising acrylic ester units, and one polymer block (B1) different in structure from the polymer block (A1) and based on (meth)acrylic ester units, are bound to one another, the block copolymer (I) having a weight average molecular weight of 120,000 or more and a molecular weight distribution (Mw/Mn) of less than 1.5; and a diblock copolymer (II) wherein one polymer block (A2) based on acrylic ester units, and one polymer block (B2) different in structure from the polymer block (A2) and based on (meth) acrylic ester units, are bound to each other, the diblock copolymer (II) having a molecular weight distribution (Mw/Mn) of less than 1.5; (ii) the ratio of the block copolymer (I):the diblock copolymer (II) contained being 100:50 to 100:500 by mass, and it is described therein that this acrylic block copolymer composition is useful an adhesive composition. However, Patent Document 4 does not describe use of the composition in a display device, endowment thereof with optical filter functions, deterioration of a light absorbing agent therein, or impact resistance thereof at all.

[Patent Document 1] Japanese Patent Application Laid-Open (JP-A) No. 2001-210988
[Patent Document 2] JP-A No. 11-126024
[Patent Document 3] Japanese Patent No. 3473310
[Patent Document 4] JP-A No. 2005-307063
[Patent Document 5] JP-A No. 2002-260539

DISCLOSURE OF INVENTION

Problem to be Solved by the Invention

As demand for the weight saving and film thinning of an optical filter is increasing to cope with an increasing size of a display device, it is considered that if adhesiveness permitting direct attachment to a front glass etc. of a display device, and optical filter functions such as a near-infrared light absorption function, a neon light absorption function and a color tone regulation function, can be realized by a single layer, then it will be possible to achieve not only weight saving and film thinning but also simplification of a production process and lower cost.

However, if a light absorbing agent (dye) having a near-infrared light absorption function, a neon light absorption function and a color tone regulation function is contained in a conventionally used adhesive layer functioning as an adhesive layer, there occurs a problem that the light absorbing agent (dye) is deteriorated to change the spectral characteristics thereof as an optical filter, thus making its practical application difficult.

For example, in the method wherein a dye such as a NIR absorbing dye is added to a bonding agent layer (incidentally, the so-called adhesive is a form of the bonding agent) applied onto an electroconductive mesh surface, to attach a composite filter to the surface of a display, as shown in Patent Document 3, the number of constituent layers and the number of production steps can certainly be reduced. However, when the bonding agent layer is located in the same side as the electroconductive mesh layer relative to a transparent substrate film, the dye reacts with each adjacent layer thus undergoing change in color or degradation in color to cause a problem of change in absorption spectrum characteristics, that is, deterioration in the light absorbing agent. This deterioration in the light absorbing agent, though occurring when left for a long time even in a room-temperature atmosphere (ambient temperature about 10 to 20° C., relative humidity about 30 to 60%), will be promoted significantly in a high-temperature atmosphere (ambient temperature 50° C. or more) or in a high-temperature high-humidity atmosphere (ambient temperature 50° C. or more and relative humidity 70% or more). This tendency applies particularly to a NIR absorbing dye mainly using an organic dye based on diimmonium etc.

The reason for such dye deterioration is not completely elucidated, but it is estimated that the deterioration of a dye in a filter of such constitution is roughly divided into the following two mechanisms:

(1) [Interaction (chemical reaction) between a dye and each adjacent layer] Specifically, a dye reacts directly with, or a dye undergoes a reaction indirectly catalyzed by, metals (particularly a generally frequently used transition metal elements such as copper, iron) of an electroconductive mesh layer, metal compounds (particularly, compounds of generally frequently used transition metal elements such as copper, zinc, cobalt) constituting a blackened layer, sodium ions in a glass plate of a display device as an adherend, or atomic groups (functional groups) such as urethane linkages etc. in an urethane resin bonding agent layer if present between an electroconductive mesh layer and a transparent substrate film, thereby changing an absorption spectrum of the dye.

(2) [Interaction between a dye and a bonding agent] Specifically, components (particularly, atomic groups or functional groups) in a bonding agent to which a dye is to be added interact with (that is, chemically reacts with or catalytically acts on) a dye, to change a molecular structure of the dye followed by a change in energy level, thereby changing an absorption spectrum of the dye.

If it is a problem to merely prevent the deterioration of a dye caused by the reaction in either case, this problem can be solved by using chemically durable inorganic light absorbing agents such as carbon black (carbon), metal oxides. However, any of these highly durable light absorbing agents are low in transmittance in the visible light region and hardly applicable to image display devices where transparency is essential.

Patent Document 5 has proposed a plasma display panel comprising an optical filter with an antireflective film attached via an adhesive layer to the front face of a display, wherein the breaking energy thereof in an impact resistance test is 0.5 J or more, and it is described therein that impact resistance is conferred on, and a light absorbing agent such as a dye is added to, the adhesive layer. In the adhesive layer described in Patent Document 5, however, metal ions are crosslinked to form an ionomer resin, so the light absorbing agent is deteriorated with time to change its spectral characteristics, thus making its practical application problematic.

The present invention was made in view of these problems, and an object of the present invention is to provide an adhesive layer capable of attaining, in a single layer, both adhesiveness and desired optical filter functions and hardly undergoing the change in spectral characteristics attributable to deterioration in a light absorbing agent, during long-time use, particularly at high temperature under high humidity, especially an adhesive layer hardly undergoing the change in absorption spectrum caused by the interaction between an adhesive and a light absorbing agent added, as well as an adhesive composition capable of realizing this adhesive layer and a composite filter having optical filter functions using this adhesive layer.

Another object of the present invention is to provide a composite filter excellent in transparency which has various functions such as a NIR absorption function, a Ne light absorption function and a color correction function in addition to an electromagnetic wave shielding function, wherein the total thickness of laminated layers, the number of laminated layers, and the number of production steps can be prevented from increasing, and various light absorbing agents such as a NIR absorbing agent are added to an adhesive layer used for attaching the composite filter to the surface of a display, and even when the dyes are contacted with an electromagnetic mesh consisting of a metal, the alteration, deterioration and discoloration of the light absorbing agents caused by the interaction between the light absorbing agents and the metal or the like can be prevented.

Means for Solving the Problem

To solve the problem, the present invention provides an adhesive composition for optical filter, which comprises a multiblock copolymer having, in its molecule, at least a triblock structure wherein one polymer block (A1) comprising acrylic ester units, and two polymer blocks (B1) different in structure from the polymer block (A1) and comprising (meth) acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another; and a near-infrared light absorbing agent containing a diimmonium-based compound, wherein low-molecular-weight components in the multiblock copolymer are in such an amount that both chromatic differences Δx and Δy of a film consisting of the adhesive composition, before and after left in an atmospheric environment at an ambient temperature of 60° C. under 95% relative humidity for 1000 hours, become 0.03 or less.

To solve the problem, the present invention also provides an adhesive composition for optical filter, which comprises a multiblock copolymer having, in its molecule, at least a triblock structure wherein one polymer block (A1) comprising acrylic ester units, and two polymer blocks (B1) different in structure from the polymer block (A1) and comprising (meth)

acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another, and having a weight average molecular weight of 50,000 or more and a molecular weight distribution (Mw/Mn) of less than 1.5; and one or more light absorbing agents each having light absorption in a predetermined wavelength range.

To solve the problem, the present invention also provides an adhesive layer having optical filter functions, for being disposed on the front face of a display device, wherein the adhesive layer comprises a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth)acrylic ester units, are bound to one another; and a near-infrared light absorbing agent containing a diimmonium-based compound, wherein low-molecular-weight components in the multiblock copolymer are in such an amount that both chromatic differences Δx and Δy of a film consisting of the adhesive composition, before and after left in an atmospheric environment at an ambient temperature of 60° C. under 95% relative humidity for 1000 hours, become 0.03 or less.

To solve the problem, the present invention provides an adhesive layer having optical filter functions, for being disposed on the front face of a display device, wherein the adhesive layer comprises a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth)acrylic ester units, are bound to one another, and having a weight average molecular weight of 50,000 or more and a molecular weight distribution (Mw/Mn) of less than 1.5; and one or more light absorbing agents each having light absorption in a predetermined wavelength range.

By using the specific block copolymer and one or more light absorbing agents each having light absorption in a predetermined wavelength range according to the present invention, there can be brought about an effect that the adhesive layer can, as a single layer, attain both adhesiveness permitting direct attachment to a glass plate disposed on the front face of a display device, and desired optical filter functions, and hardly undergoes the change in spectral characteristics attributable to deterioration in a light absorbing agent, even during long-time use, particularly at high temperature under high humidity. By using the specific block copolymer, the adhesive layer of the present invention can also be endowed with impact resistance.

In addition, the adhesive composition and the adhesive layer according to the present invention preferably comprise a light absorbing agent having an absorption maximum at least at 800 to 1100 nm in view of enabling constitution of an optical filter absorbing and eliminating a near-infrared light and locally reducing the transmittance of a near-infrared light.

The adhesive composition and the adhesive layer according to the present invention can contain a phthalocyanine-based compound and/or a diimmonium-based compound as the light absorbing agent having an absorption maximum at least at 800 to 1100 nm. In particular, the diimmonium-based compound is a compound preferable as a near-infrared light absorbing agent in view of high absorption in the near-infrared region, a broad absorption region and high transmittance in the visible region, but is a compound easily deteriorated during long-time use, particularly at high temperature under high humidity and is thus conventionally hardly applicable to an adhesive. In the specific block copolymer according to the present invention, it can be prevented from being deteriorated even at high temperature under high humidity and can thus preferably used as a near-infrared light absorbing agent.

The adhesive composition and the adhesive layer according to the present invention preferably contain a light absorbing agent having an absorption maximum at least at 570 to 610 nm in view of attaining a vivid red color by suppressing emission of an orange light at least from a display.

The adhesive layer according to the present invention preferably has a thickness of 50 to 5,000 μm and impact resistance against a breaking energy of 0.5 J or more in a falling ball impact test of dropping a steel ball with a mass of 534 g, because the adhesive layer having optical filter functions can also have impact resistance.

The composite filter according to the present invention is a composite filter having optical filter functions for direct attachment to a glass plate disposed on the front face of a display device, comprising the adhesive layer of the invention laminated with one or more functional layers having one or more functions selected from an electromagnetic wave shielding function, an antireflection function, an antiglare function, a UV absorption function and a surface protection function.

In the composite filter according to the present invention, the transmittance in the wavelength range of 800 to 1100 nm is preferably 30% or less, in view of shielding an near-infrared light which can be emitted from the inside of a display to give erroneous operation to other instruments.

In the composite filter according to the present invention, the transmittance in the maximum absorption wavelength range of 560 to 630 nm is preferably 50% or less, in view of shielding a neon light which can be emitted from the inside of a display to influence a color tone.

In the composite filter according to the present invention, the transmittance in the visible light wavelength range of 380 to 780 nm is preferably 20% or more, in view of obtaining the composite filter having high transparency and low reduction in image contrast in the presence of an external light.

The composite filter in one preferable embodiment of the present invention is preferably a composite filter comprising an electroconductive mesh layer using a metal, and an adhesive layer, formed in this order on one side of a transparent substrate film and a surface protective layer formed on the other side of the transparent substrate film, wherein the adhesive layer comprises three kinds of light absorbing agents, that is, a near-infrared light absorbing agent, a neon light absorbing agent, and a color correcting light absorbing agent, wherein the composite filter has at least an electromagnetic wave shielding function, a near-infrared light absorption function, a neon light absorption function, a color correction function and a surface protection function, and wherein the adhesive layer comprises, as the adhesive resin, a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another, and having a weight average molecular weight of 50,000 or more and a molecular weight distribution (Mw/Mn) of less than 1.5. (hereinafter, the composite filter having the above constitution may be sometimes called "simple filter").

The composite filter is preferably a composite filter wherein the surface protective layer has an antireflection function or an antiglare function.

EFFECT OF THE INVENTION

The adhesive composition according to the present invention can achieve an effect that there can be provided an adhesive layer attaining both adhesiveness and desired optical filter functions in its single layer and hardly undergoing the change in spectral characteristics attributable to deterioration in a light absorbing agent, even during long-time use, particularly at high temperature under high humidity.

The adhesive layer according to the present invention can achieve an effect that it attains, in a single layer, both desired optical filter functions and adhesiveness, particularly adhesiveness permitting direct attachment to a glass plate disposed on the front face of a display device, hardly undergoes the change in spectral characteristics attributable to deterioration in a light absorbing agent, even during long-time use, particularly at high temperature under high humidity, enables simplification of the production process, and reduces the production cost.

The composite filter having optical filter functions according to the present invention comprises one or more functional layers laminated on the adhesive layer according to the present invention, thereby making it less liable to undergo the change in spectral characteristics attributable to deterioration in a light absorbing agent, even during long-time use, particularly at high temperature under high humidity, thus making spectral characteristics excellent in stability. As compared with a conventional composite filter attached directly to the display surface of a plasma display panel, the composite filter of the present invention can simplify its layer structure, enables weight saving and thinning, can simplify the production process and reduce production costs.

When the composite filter according to the present invention is constituted particularly as the simple filter described above, three kinds of optical filter functions by light absorbing agents, that is, a NIR absorption function, a Ne light absorption function, and a color correction function, are realized by adding light absorbing agents having the respective functions to the adhesive layer, wherein the adhesive used in the adhesive layer makes use of a specific substance thereby preventing the alteration and deterioration of the light absorbing agents caused by the interaction between the adhesive layer or each adjacent layer and the light absorbing agents having the respective functions, and the discoloration of the light absorbing agents can thereby prevented.

By a surface protective layer, the surface of the transparent substrate film of the composite filter can be protected against scratch, contamination or the like.

As compared with a composite film endowed with functions such as a NIR absorption function, a Ne light absorption function and a color correction function by laminating filter films, the composite filter of the invention can prevent an increase in the total thickness thereof, in the number of constituent layers, and in the number of production steps.

DESCRIPTION OF SYMBOLS

Figure 1:
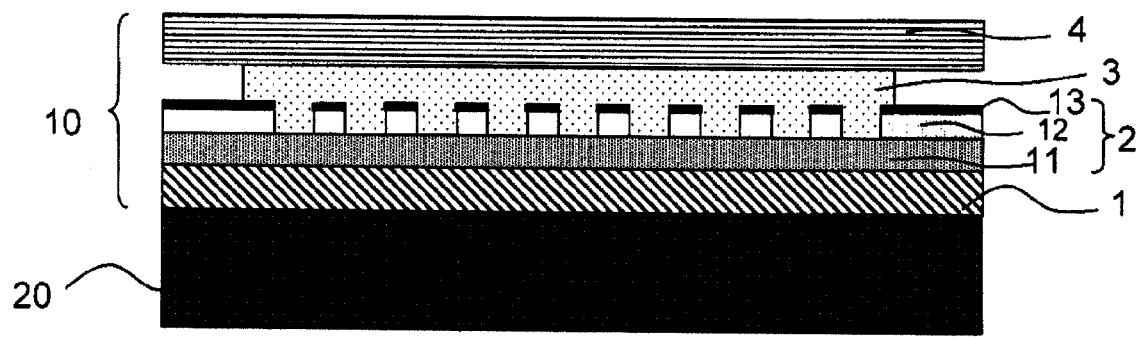
FIG. 1 is a sectional view of one example of a laminate structure wherein the composite filter of the invention is attached directly to the front face of a plasma display panel.

1: adhesive layer
2: electromagnetic wave shielding layer
3: adhesive layer
4: antireflective layer
5: surface protective layer
10: composite filter
11: transparent substrate
12: electroconductive mesh layer
13: blackening treatment
20: plasma display panel
31: test stand
32: base
33: glass plate
34: electromagnet
35: steel ball
121: mesh area
122: earthing area

BEST MODE FOR CARRYING OUT THE INVENTION

The present invention includes an adhesive composition for optical filter, an adhesive layer having optical filter functions, and a composite filter having optical filter functions using same. Hereinafter, these are described in detail.

I. Adhesive Layer Having Optical Filter Functions

The first adhesive layer having optical filter functions according to the present invention is an adhesive layer for being disposed on the front face of a display device, comprising a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another; and a near-infrared light absorbing agent containing a diimmonium-based compound, wherein low-molecular-weight components in the multiblock copolymer are in such an amount that both chromatic differences $\Delta x$ and $\Delta y$ of a film consisting of the adhesive composition, before and after left in an atmospheric environment at an ambient temperature of 60° C. under 95% relative humidity for 1000 hours, become 0.03 or less.

The low-molecular-weight components in the multiblock copolymer refer to residues of reactive substances such as a polymerization initiator, a molecular-weight regulating agent and other additives used in synthesizing the multiblock copolymer, as well as to residual monomers, and oligomers having a polymerizable functional group at its structural terminal due to insufficient polymerization. The low-molecular-weight components can have functional groups or atomic groups capable of giving a change (deterioration) in absorption spectra of various light absorbing agents. The weight average molecular weight of less than 10,000 can be used as a target for the low-molecular-weight components.

In the low-molecular-weight components, typical examples of the functional groups or atomic groups capable of giving a deterioration of a light absorbing agent (that is, a change in absorption spectrum, particularly a change in absorption spectrum in the visible light region) include a hydroxyl group, a carboxyl group, an isocyanate group, and a urethane bond.

Focusing attention on a specific multiblock copolymer as an adhesive in an adhesive layer, an allowable amount of components that deteriorate a diimmonium-based near-infrared light absorbing agent contained in the multiblock copolymer is selected using, as an indicator, chromatic differences $\Delta x$ and $\Delta y$ that are changes in a spectrum, in the visible region, of the diimmonium-based near-infrared light absorbing agent in a high-temperature high-humidity environment, thereby solving the problem described above.

According to the first adhesive layer of the present invention, a specific block copolymer wherein the content of the low-molecular-weight components is lower than a predetermined amount is combined with a near-infrared light absorbing agent containing a diimmonium-based compound that is easily deteriorated but has a broad absorption region and high transmittance in the visible region, thereby achieving an effect that the adhesive layer can prevent the deterioration of the light absorbing agent caused by the interaction between the near-infrared light absorbing agent containing a diimmonium-based compound and the adhesive, can in a single layer have both adhesiveness and desired near-infrared light absorption function, and hardly undergoes the change in spectral characteristics attributable to deterioration in the light absorbing agent, even during long-time use, particularly at high temperature under high humidity.

The second adhesive layer having optical filter functions according to the present invention is an adhesive layer for being disposed on the front face of a display device, comprising a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another, and having a weight average molecular weight of 50,000 or more and a molecular weight distribution (Mw/Mn) of less than 1.5; and one or more light absorbing agents each having light absorption in a predetermined wavelength range.

According to the second adhesive layer of the present invention, the specific block copolymer and one or more light absorbing agents each having light absorption in a specific wavelength range are used thereby bringing about an effect that the adhesive layer can, in a single layer, have both adhesiveness and desired optical filter functions and hardly undergoes the change in spectral characteristics attributable to deterioration in a light absorbing agent, even during long-time use, particularly at high temperature under high humidity.

The adhesive layer having optical filter functions according to the present invention has adhesiveness permitting direct attachment to a glass plate disposed on the front face of a display device, but insofar as the adhesive layer having optical filter functions is disposed at the front face of a display device, the adhesive layer may, without direct attachment to a glass plate disposed on the front face of a display device, be used by arranging it between another functional layer and a substrate to bond these layers via the adhesive. The adhesiveness permitting inter layer attachment or direct attachment to a glass plate disposed on the front face of a display device is required to have so-called stickiness, which is adhesiveness of such a degree that the adhesive layer can be semipermanently used without peeling or slippage and can, after attachment, be peeled relatively easily from a flat and smooth surface. Particularly when the adhesive layer is used by attaching it directly to a glass plate disposed on the surface of a display, the adhesive layer also requires removability to make the display device reusable (reworkable) after peeling.

The adhesive layer that can, in a singe layer, have both desired optical filter functions and adhesiveness permitting direct attachment to a glass plate disposed on the front face of a display device has advantageous in that the adhesive layer, when used in forming an optical film, can simplify its layer structure, enables weight saving and thinning, can simplify the production process and reduce production costs, but if a light absorbing agent achieving desired optical filter functions is added to a selected material having adhesiveness permitting direct attachment to a glass plate, the light absorbing agent is easily deteriorated during long-time use, particularly at high temperature under high humidity, thus leading to a problem that an adhesive layer having highly stable optical filter functions is hardly practically applicable. For example, an adhesive layer often contains reactive monomers such as a crosslinking agent so as to give excellent adhesiveness and film-forming property, but when such highly reactive monomers are contained, a light absorbing agent such as a near-infrared light absorbing agent is significantly deteriorated.

In the present invention, on the other hand, the above-described specific block copolymer is used as the resin in the adhesive layer, so that even if a light absorbing agent achieving desired optical functions is contained, the resulting adhesive layer can prevent the deterioration of the light absorbing agent caused by the interaction between the light absorbing agent and the adhesive, thus preventing the light absorbing agent from being deteriorated during use for a long time, particularly at high temperature under high humidity and attaining highly stable optical filter functions less liable to change spectral characteristics.

The block copolymer used in the adhesive layer of the present invention is a block copolymer having a specific triblock structure in its molecular and having a weight average molecular weight of 50,000 or more and a molecular weight distribution (Mw/Mn) of less than 1.5, thereby allowing the block copolymer to form a functional layer serving as a single layer having both desired optical filter functions and adhesiveness permitting direct attachment to a glass plate disposed on the front face of a display device and hardly undergoing the change in spectral characteristics attributable to deterioration in a light absorbing agent, even during long-time use, particularly at high temperature under high humidity; the reason for this achievement is not evident, but is estimated as follows:

That is, easy deterioration of a light absorbing agent in a conventional material having adhesiveness permitting direct attachment to a glass plate is considered attributable to formation of an ionomer resin by crosslinking metal ions, to incorporation of a highly reactive crosslinking agent, and to incorporation of highly reactive monomer and oligomer components.

On the other hand, the block copolymer used in the present invention has a specific triblock structure in its molecule, and thus its formed coating is estimated to have a pseudo-crosslinked structure so as easily to form a microphase-separated structure, resulting not only in making it excellent in adhesiveness and film-forming property without adding a crosslinking agent but also in endowing it with impact resistance. The block copolymer used in the present invention has a weight average molecular weight of 50,000 or more with a narrow molecular weight distribution (Mw/Mn) of less than 1.5 so that the adhesiveness and film-forming property are not deteriorated, and because highly reactive monomer and oligomer components are not contained, a light absorbing agent even when allowed to coexistent is estimated to be less liable to deterioration even during long-time use, particularly at high temperature under high humidity.

As described above, a specific block copolymer is selected in the present invention, so that without containing a crosslinking agent, necessary adhesiveness and film-forming property can be realized and the light absorbing agent can be prevented from being deteriorated, thus making it possible to form a functional layer that can, in a single layer, have both desired optical filter functions and adhesiveness permitting direct attachment to a glass plate disposed on the front face of a display device and hardly undergoes the change in spectral characteristics attributable to deterioration in a light absorbing agent, even during long-time use, particularly at high temperature under high humidity.

The adhesive layer having optical filter functions according to the present invention contains at least the above-described specific block copolymer and one or more light absorbing agents each having light absorption in a predetermined wavelength range and may if necessary contain other components.

The adhesive layer having optical filter functions according to the present invention can be formed by using the following adhesive composition for optical filter according to the present invention. First, the adhesive composition for optical filter according to the present invention is described in detail.

<<Adhesive Composition for Optical Filter>>

The first adhesive composition for optical filter according to the present invention is an adhesive composition for optical filter, which comprises a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth)acrylic ester units, are bound to one another; and a near-infrared light absorbing agent containing a diimmonium-based compound, wherein low-molecular-weight components in the multiblock copolymer are in such an amount that both chromatic differences Δx and Δy of a film consisting of the adhesive composition, before and after left in an atmospheric environment at an ambient temperature of 60° C. under 95% relative humidity for 1000 hours, become 0.03 or less.

A film consisting of the adhesive composition as a test sample to be measured for its chromatic difference can be prepared for example in the following manner. The adhesive composition is applied in a dry-coating thickness of 25 μm on a release-treated PET (for example, E7002 manufactured by Toyobo Co., Ltd.), dried as necessary, and then a release-treated PET film is laminated thereon, to form a film. Then, the film is attached to glass (for example, PD-200, thickness 2.8 mm, manufactured by Asahi Glass Co., Ltd.), and a PET film (for example, A4100, thickness 50 μm, manufactured by Toyobo Co., Ltd.) is laminated thereon, to prepare a test sample.

The second adhesive composition for optical filter according to the present invention comprises a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth)acrylic ester units, are bound to one another, and having a weight average molecular weight of 50,000 or more and a molecular weight distribution (Mw/Mn) of less than 1.5; and one or more light absorbing agents each having light absorption in a predetermined wavelength range.

The adhesive composition for optical filter according to the present invention contains at least the specific block copolymer and one or more light absorbing agents each having light absorption in a predetermined wavelength range and may contain other compounds if necessary.

Hereinafter, each constitution of the adhesive composition of the present invention is described in detail.

<Multiblock Copolymer Having a Specific Triblock Structure>

The ternary or more multiblock copolymer as the essential component of the present invention comprises, in its molecule, any structure of the following {(I-a) or (I-b)}. In particular, the multiblock copolymer used in the second embodiment of the present invention has a weight average molecular weight of 50,000 or more and a molecular weight distribution (Mw/Mn) of less than 1.5.

(I-a) A Triblock Structure (A1)-(B1)-(B1) or (B1)-(A1)-(B1), wherein one polymer block (A1) (also referred to simply as (A1) hereinafter) comprising acrylic ester units, and two polymer blocks (B1) (also referred to simply as (B1) hereinafter) different in structure from the polymer block (A1) and comprising (meth)acrylic ester units, are bound to one another.

(I-b) A Triblock Structure (A1)-(A1)-(B1) or (A1)-(B1)-(A1), wherein two polymer blocks (A1) comprising acrylic ester units, and one polymer block (B1) different in structure from the polymer block (A1) and comprising (meth)acrylic ester units, are bound to one another.

As used herein, the term "(meth)acrylic ester unit" refers to an acrylic ester unit and/or a methacrylic ester unit.

Alternatively, the multiblock copolymers may be used alone but can be used as a mixture of two or more thereof in order to attain desired required performance more accurately or in a higher degree of freedom.

The multiblock copolymer may be:

a triblock copolymer consisting of one or two polymer blocks (A1) and one or more polymer blocks (B1): that is, (A1)-(B1)-(B1),
(B1)-(A1)-(B1),
(A1)-(A1)-(B1) or
(A1)-(B1)-(A1), or may be:

a tetra block or more block copolymer having one or two or more polymer blocks (C1), (C2), (C3) . . . (hereinafter, these polymer blocks are sometimes referred to collectively as "polymer block (C)") bound to the aforesaid triblock copolymer: that is, (A1)-(B1)-(B1)-(C),
(B1)-(A1)-(B1)-(C),
(A1)-(A1)-(B1)-(C) or
(A1)-(B1)-(A1)-(C).

In particular, the multiblock copolymer is preferably a block copolymer having seven or less blocks, more preferably a triblock copolymer having three blocks (that is, the copolymer to which the polymer block (C) is not added), from the viewpoint of easy production, handling and ease in production.

In the triblock copolymer in (I-a) above represented by the formula (B1)-(A1)-(B1) and in the triblock copolymer in (I-b) above represented by the formula (A1)-(B1)-(A1), the two polymer blocks positioned at both ends (that is, (A1) and (A1) or (B1) and (B1)) may be the same or different in so far as they are different in structure from the polymer block positioned in the center.

It is necessary that in the triblock copolymer represented by the formula (A1)-(B1)-(B1) in (I-a) above or the formula (A1)-(A1)-(B1) in (I-b) above, the two polymer blocks adjacent to each other (that is, (A1) and (A1) or (B1) and (B1)) are different from each other in structure and also different in structure from another polymer block {that is, (B1) for (A1)-(A1), or (A1) for (B1)-(B1)}.

The phrase "the polymer blocks are different from each other in structure" shall satisfy the following condition: the polymer blocks are different from each other in the type, composition and/or stereoregularity of monomer units constituting each polymer block.

In the above acrylic block copolymer, the triblock copolymer represented by the formula (B1)-(A1)-(B1) in (I-a) is more preferably used because the adhesive (composition) is excellent in adhesive properties such as adhesion, cohesion and tackiness and also in heat resistance.

The polymer block (A1) constituting the multiblock copolymer is a polymer block consisting of an acrylic ester-based polymer comprising an acrylic ester-derived structural unit (acrylic ester unit).

The content, in the polymer block (A1) in the block copolymer, of the structural unit derived from an acrylic ester may be selected from structural units in the experimentally optimum range, depending on specific use, required performance, and other compounded components such as a light absorbing agent. In particular, the polymer block (A1) in the block copolymer preferably contains an acrylic ester-derived structural unit (acrylic ester unit) in a ratio of 50 mass % or more.

The acrylic ester unit constituting the polymer block (A1) is preferably a structural unit derived from an alkyl acrylate whose alkyl group may have a substituent and/or a cyclic alkyl acrylate whose cyclic alkyl group may have a substituent. Specific examples of the alkyl acrylate and cyclic alkyl acrylate include methyl acrylate, ethyl acrylate, n-propyl acrylate, isopropyl acrylate, n-butyl acrylate, isobutyl acrylate, sec-butyl acrylate, tert-butyl acrylate, n-hexyl acrylate, 2-ethylhexyl acrylate, dodecyl acrylate, tridecyl acrylate, stearyl acrylate, cyclohexyl acrylate, isobornyl acrylate, 2-methoxyethyl acrylate, 2-(N,N-dimethylamino) ethyl acrylate, trifluoromethyl acrylate, and trimethoxysilylpropyl acrylate. The polymer block (A1) can be formed from one or more of the above-described alkyl acrylates and cyclic alkyl acrylates.

In particular, it is preferable from the viewpoint of excellent adhesiveness of the resulting adhesive layer to a substrate that the polymer block (A1) is a block consisting of a polymer in which structural units derived from one or more alkyl acrylates having an alkyl group containing 4 or more carbon atoms, such as n-butyl acrylate, isobutyl acrylate, sec-butyl acrylate, tert-butyl acrylate, n-hexyl acrylate, 2-ethylhexyl acrylate, dodecyl acrylate, tridecyl acrylate and stearyl acrylate and from one or more alkyl acrylates whose alkyl group has a substituent, such as 2-methoxyethyl acrylate, 2-(N,N-dimethylamino) ethyl acrylate, trifluoromethyl acrylate, and trimethoxysilylpropyl acrylate are contained in a ratio of 50 mass % or more.

Particularly from the viewpoint of the water resistance of each polymer block, the polymer block (A1) is more preferably a block consisting of a polymer containing, in a ratio of 50 mass % or more, structural units derived from one or more members selected from n-butyl acrylate, n-hexyl acrylate, 2-ethylhexyl acrylate, dodecyl acrylate, tridecyl acrylate and stearyl acrylate, more preferably a polymer block consisting of a polymer containing, in a ratio of 50 mass % or more, structural units derived from n-butyl acrylate or 2-ethylhexyl acrylate.

The polymer block (A1) preferably contains an acrylic ester unit in a ratio of 50 mass % or more, more preferably 80 mass % or more, still more preferably 90 mass % or more, further more preferably 100 mass %, based on the mass of the polymer block (A1). When the ratio of the acrylic ester unit in the polymer block (A1) is less than 50 mass %, the adhesion and impact resistance of the resulting adhesive layer tend to be deteriorated, and the object of the present invention may hardly be achieved.

Other monomer units which are contained preferably in a ratio of 50 mass % or less, more preferably 20 mass % or less, still more preferably 10 mass % or less, in the polymer block (A1) in the block copolymer, include for example structural units derived from monomers such as alkyl methacrylates [for example, methyl methacrylate, ethyl methacrylate, isopropyl methacrylate, sec-butyl methacrylate, isobutyl methacrylate, tert-butyl methacrylate, cyclohexyl methacrylate, and other polymer block (B1)-forming methacrylates described later], methacrylamides such as methacrylamide, N-methylmethacrylamide, N-ethylmethacrylamide, N-isopropylmethacrylamide, N,N-dimethylmethacrylamide and N,N-diethylmethacrylamide; acrylamides such as acrylamide, N-methylacrylamide, N-ethylacrylamide, N-isopropylacrylamide, N,N-dimethylacrylamide and N,N-diethylacrylamide; carboxyl group-containing vinyl monomer such as methacrylic acid, acrylic acid, ctotonic acid, maleic acid, maleic anhydride and fumaric acid; aromatic vinyl monomers such as styrene, α-methylstyrene and p-methylstyrene; conjugated diene monomers such as butadiene and isoprene; olefins such as ethylene and propylene; and lactones such as ε-caprolactone and valerolactone.

The polymer block (B1) constituting the multiblock copolymer is a polymer block comprising (meth)acrylic ester units and consisting of a polymer different in structure from the polymer block (A1). The (meth)acrylic ester unit is preferably a structural unit derived from an alkyl (meth)acrylate whose alkyl group may have a substituent and/or a cyclic alkyl (meth)acrylate whose cyclic alkyl group may have a substituent.

The content, in the polymer block (B1), of the structural unit derived from (meth)acrylic ester may be selected from structural units in the experimentally optimum range, depending on specific use, required performance, and other compounded components such as a light absorbing agent. In particular, the polymer block (B1) preferably contains a methacrylic ester structural unit in a ratio of 50 mass % or more, from the viewpoint of the effect of the present invention. The methacrylic ester unit is preferably a structural unit derived from an alkyl methacrylate whose alkyl group may have a substituent and/or a cyclic alkyl methacrylate whose cyclic alkyl group may have a substituent. Specific examples of the alkyl methacrylate and cyclic alkyl methacrylate include methyl methacrylate, ethyl methacrylate, isopropyl methacrylate, sec-butyl methacrylate, isobutyl methacrylate, tert-butyl methacrylate, cyclohexyl methacrylate, isobornyl methacrylate, 2-methoxyethyl methacrylate, 2-(N,N-dimethylamino)ethyl methacrylate, trifluoromethyl methacrylate, n-pentyl methacrylate, n-hexyl methacrylate, 2-ethylhexylmethacrylate, dodecylmethacrylate, tridecyl methacrylate, stearyl methacrylate, 2-methoxypentyl methacrylate, 2-(N,N-dimethylamino)pentyl methacrylate, perfluoropentyl methacrylate, and 2-trimethoxysilylpentyl methacrylate.

From the viewpoint of improvement of the durability of a light absorbing agent in the resulting adhesive layer, it is preferable that the polymer block (B1) is particularly a block consisting of a polymer containing, in a ratio of 50 mass % or more, a structural unit derived from an alkyl methacrylate having an alkyl group containing 1 to 4 carbon atoms, such as methyl methacrylate, ethyl methacrylate, isopropyl methacrylate, sec-butyl methacrylate, isobutyl methacrylate and tert-butyl methacrylate and a structural unit derived from an alkyl methacrylate having an alkyl group having a cyclic structure, such as cyclohexyl methacrylate and isobornyl methacrylate.

Particularly, the polymer block (B1) is preferably a block consisting of a polymer containing 50 mass % or more of a structural unit derived from methyl methacrylate, from the viewpoint of transparency and improvement of the durability of a light absorbing agent.

The polymer block (B1) preferably contains the methacrylic ester-derived structural unit (methacrylic ester unit) in a ratio of 50 mass % or more, more preferably 80 mass % or more, still more preferably 90 mass % or more, further more preferably 100 mass %, based on the mass of the polymer block (B1). When the ratio of the methacrylic ester unit in the polymer block (B1) is less than 50 mass %, the adhesion and impact resistance of the resulting adhesive layer tend to be deteriorated, and the object of the present invention may hardly be achieved.

Other monomer units which are contained preferably in a ratio of 50 mass % or less, preferably 20 mass % or less, more preferably 10 mass % or less, in the polymer block (B1) in the block copolymer include, for example, structural units derived from monomers such as the above-mentioned acrylic esters; the above-mentioned methacrylamides; the above-mentioned acrylamides; the above-mentioned carboxyl group-containing vinyl monomers; the above-mentioned aromatic vinyl monomers; the above-mentioned conjugated diene monomers; the above-mentioned olefins; and the above-mentioned lactones.

If the block copolymer is a tetra block or more block copolymer having one or more polymer blocks (C) in addition to one polymer block (A1) and two polymer blocks (B1) or in addition to two polymer blocks (A1) and one polymer block (B1), then the type and constituent of the polymer block (C) are not limited. As long as the tetra block or more block structure can be formed, the polymer block (C) may be the same as, or different from, the polymer block (A1) and/or the polymer block (B1). When the block copolymer is a pentablock or more block copolymer having two or more polymer blocks (C), the polymer blocks (C) may be the same or different from one another.

The polymer block (C) may be for example a polymer block having structural units derived from one or more of the above-mentioned monomers such as methacrylic esters; acrylic esters; methacrylamides; acrylamides; aromatic vinyl monomers; conjugated diene monomers; olefins; and lactones.

In particular, the polymer block (C) is preferably a polymer block containing 50 mass % or more structural units derived from methacrylic esters, acrylic esters, or aromatic vinyl monomers, from the viewpoint of heat stability and ease in introduction of the polymer block (C) into the block copolymer, more preferably a polymer block containing 50 mass % or more structure units derived from methacrylic esters and/or acrylic esters, from the viewpoint of heat resistance and the like.

In the present invention, the multiblock copolymer is preferably a block copolymer having a weight average molecular weight (Mw) of 50,000 or more, more preferably a weight average molecular weight (Mw) of 60,000 or more, from the viewpoint of good balance between adhesiveness and film-forming property and hard deterioration of a light absorbing agent. From the viewpoint of fluidity, the weight average molecular weight (Mw) of the block copolymer is preferably 500,000 or less, more preferably 300,000 or less. From these viewpoints, the block copolymer used in the present invention is preferably a block copolymer having a weight average molecular weight (Mw) of 50,000 to 500,000, more preferably a block copolymer having a weight average molecular weight of 60,000 to 300,000.

It was revealed that even if the same light absorbing agent is used, the durability of the light absorbing agent is deteriorated when the weight average molecular weight (Mw) of the multiblock copolymer is less than that defined above and is lower or when the molecular weight distribution (Mw/Mn) is out of that defined below and is broader. This tendency was observed when the light absorbing agent is an organic dye such as a near-infrared light absorbing agent, particularly a diimmonium-based compound.

The molecular weight of the polymer block (A1) in the multiblock copolymer used in the present invention is not particularly limited, but from the viewpoint of good balance between the adhesiveness and impact resistance of the resulting adhesive layer, the weight average molecular weight (Mw) of the polymer block (A1) is preferably 10,000 to 500,000, more preferably 20,000 to 300,000.

The molecular weight of the polymer block (B1) in the multiblock copolymer used in the present invention is not particularly limited either, but from the viewpoint of good balance between the adhesiveness and impact resistance of the resulting adhesive layer, the weight average molecular weight (Mw) of the polymer block (B1) is preferably 1,000 to 50,000, more preferably 5,000 to 30,000.

When the multiblock copolymer used in the present invention is a tetra block or more block copolymer having the polymer block (C) in addition to the polymer block (A1) and the polymer block (B1), the molecular weight of the polymer block (C) is not particularly limited, but for effectively exhibiting heat resistance and mechanical properties, the weight average molecular weight (Mw) of the polymer block (C) is preferably 1,000 to 50,000, more preferably 1,000 to 30,000.

The molecular weight distribution (Mw/Mn) represented by the ratio (Mw/Mn) of the weight average molecular weight (Mw) to number-average molecular weight (Mn) of the multiblock copolymer used in the present invention is preferably less than 1.5, more preferably 1.4 or less, still more preferably 1.3 or less, further more preferably 1.2 or less.

When the molecular weight distribution (Mw/Mn) of the multiblock copolymer used in the present invention is less than 1.5 and the molecular weight distribution is narrow, the adhesiveness, film-forming property and impact resistance of the resulting adhesive layer can be improved, and the deterioration of the light absorbing agent by highly reactive low-molecular-weight components etc. can be suppressed.

The weight average molecular weight (Mw) and the molecular weight distribution (Mw/Mn) in this specification are determined with polystyrene-equivalent molecular weight by GPC (gel permeation chromatography). For example, GPC unit "HLC-8020" manufactured by Tosoh Corporation is used as an apparatus; "TSKgel GMHXL", "G4000HXL" and "G5000HXL" manufactured by Tosoh Corporation are connected in series as separation columns; and the sample can be measured with tetra hydrofuran as the eluent at a flow rate of 1.0 ml/min. at a column temperature of 40° C. with a differential refractive index (RI) detector.

The glass transition temperature of the polymer block (A1) in the block copolymer used in the present invention is preferably −40° C. to 50° C., more preferably −30° C. to 30° C., from the viewpoint of adhesiveness. The glass transition temperature of the polymer block (B1) in the block copolymer used in the present invention is preferably 80° C. to 140° C., more preferably 100° C. to 120° C., from the viewpoint of adhesiveness. Using a combination of the polymer blocks having such glass transition temperatures, the polymer block (A1) serves as a softer segment, and the polymer block (B1) serves as a harder segment, thereby easily forming a microphase-separated structure and easily improving film-forming property and impact resistance together with adhesiveness. Particularly when the block copolymer has the triblock structure (B1)-(A1)-(B1) wherein the glass transition temperature of the polymer block (A1) as determined by a differential scanning calorimeter is −40° C. to 50° C. and the glass transition temperature of the polymer block (B1) as determined by a differential scanning calorimeter is 100° C. to 120° C., a pseudo-crosslinked structure is easily formed by the polymer block (B1), thereby improving impact resistance together with adhesiveness.

The glass transition temperature in this specification is measured with a differential scanning calorimeter (for example, DSC204 Phoenix manufactured by NETZSCH) according to JIS K7121. The measurement method can be carried out for example at a measurement initiation temperature of −50° C., at a measurement termination temperature of 200° C., and at an increasing and decreasing temperature rate of 2° C./min., in a nitrogen atmosphere. As used herein, the glass transition temperature refers to the temperature (midpoint glass transition temperature) at which a line located at an equal distance in the ordinate direction from an extending line of each base line intersects with a curve of glass transition with stepwise change.

In the block copolymer used in the present invention, the content of the polymer block (B1) (or when two polymer blocks (B1) are contained, the total content thereof) is preferably 5 to 30 mass % (the content of the polymer block (A1) is 95 to 70 mass %), more preferably 5 to 22 mass %, even more preferably 5 to 20 mass %, based on the mass of the block copolymer, from the viewpoint of attaining an adhesive layer more excellent in adhesiveness and impact resistance.

The method for manufacturing the block copolymer used in the present invention is not particularly limited, and any methods may be used insofar as the multiblock copolymer having the properties described above and preferably having a weight average molecular weight of 50,000 or more and a molecular weight distribution (Mw/Mn) of less than 1.5. The block copolymer having a narrow molecular weight distribution (Mw/Mn) of less than 1.5 used in the present invention can be produced easily by an anion polymerization method or an atom transfer radical polymerization method (ATRP), particularly an anion polymerization method.

From the point of view that a polymer having a narrower molecular weight distribution (Mw/Mn) can be produced, and the intended block copolymer can be purified with high purity, examples of the anion polymerization method include a method of anion polymerization with an organic alkali metal compound as a polymerization initiator in the presence of a mineral acid salt such as a salt with an alkali metal or an alkaline earth metal (see Japanese Patent Application Publication No. 7-25859), a method of anion polymerization with an organic alkali metal compound as a polymerization initiator in the presence of an organoaluminum compound (see JP-A No. 11-335432) and a method of anion polymerization with an organic rare earth metal complex as a polymerization initiator (see JP-A No. 6-93060).

When the anion polymerization is used, there is an advantage that a polymer having a narrower molecular weight distribution can be produced, residual monomers can be reduced, and the formed block copolymer has a highly syndiotactic molecular structure and a high glass transition temperature (Tg) From these viewpoints, the block copolymer used in the present invention is preferably a block copolymer obtained by anion polymerization. In particular, the block copolymer obtained by anion polymerization in the presence of an organoaluminum compound is preferably used because anion polymerization can be carried out at a relatively high temperature instead of very low temperature, thereby reducing the environmental burden (mainly the cost of a cold chamber machine for regulating the polymerization temperature) in producing the block copolymer.

When the block copolymer used in the present invention is produced by anion polymerization, it is possible to use a method wherein acrylic ester monomers or (meth)acrylic ester monomers for forming the respective polymer blocks in the block copolymer are successively polymerized for example in the presence of an organic lithium compound and a specific organoaluminum compound as described in JP-A No. 11-335432 supra, further using, if necessary, N,N,N',N'',N''-pentamethyldiethylenetriamine or another tertiary amine, 1,2-dimethoxyethane, or an ether such as crown ether such as 12-crown-4 (see Patent Document 3).

The content of residual reactive substances and reactive low-molecular-weight components such as residual monomers and oligomers, which may be contained in the multiblock copolymer, varies depending on properties thereof and is not particularly limited, but is preferably for example 100 ppm by weight or less, more preferably 1 ppm by weight or less.

<Light Absorbing Agent>

The light absorbing agent having light absorption in a predetermined wavelength range used in the present invention is used for the purpose of eliminating an unnecessary light component emitted from a display device and of making display colors vivid. A light absorbing agent having an absorption maximum in a desired wavelength region depending on the purpose is suitably used. Specific examples include a light absorbing agent having an absorption maximum at least at 800 to 1100 nm (hereinafter referred to particularly as "near-infrared light absorbing agent"), a light absorbing agent for the purpose of absorbing a neon light having an absorption maximum at least at 570 to 610 nm (hereinafter referred to particularly as "neon light absorbing agent") and a light absorbing agent (dye) for the purpose of regulating a color tone having an absorption maximum at least at 380 to 570 nm or 610 to 780 nm (hereinafter referred to as "color correction dye"). These light absorbing agents may be used alone or as a mixture of two or more thereof. If necessary, another light absorbing agent having an absorption maximum at a wavelength of 380 nm or less (hereinafter referred to particularly as "UV absorbing agent") may be added as described later.

(Near-Infrared Light Absorbing Agent)

The near-infrared light absorbing agent can be selected from arbitrary compounds capable of absorbing light in the wavelength range of 800 to 1100 nm. The near-infrared light absorbing agent is particularly preferably the one absorbing light in the wavelength range of 800 to 1100 nm and having sufficient light transmittance with less absorption in the visible light region, that is, in the wavelength region of 380 to 780 nm.

Specifically as the near-infrared light absorbing agent having the absorption maximum wavelength at least in the wavelength region of 800 to 1100 nm, it is possible to use one or more members selected from organic near-infrared light absorbing agents such as polymethine-based compounds, cyanine-based compounds, phthalocyanine-based compounds, naphthalocyanine-based compounds, naphthoquinone-based compounds, anthraquinone-based compounds, dithiol-based compounds, immonium-based compounds, diimmonium-based compounds, aminium-based compounds, pyrylium-based compounds, serylium-based compounds, squarylium-based compounds, copper complexes, nickel complexes and dithiol-based metal complexes and inorganic near-infrared light absorbing agents such as tin oxide, indium oxide, magnesium oxide, titanium oxide, chromium oxide, zirconium oxide, nickel oxide, aluminum oxide, zinc oxide, iron oxide, antimony oxide, lead oxide, bismuth oxide and lanthanum oxide. The term "based compounds", for example the term "anthraquinone-based compounds" refers to anthraquinone derivatives. Particularly, the anthraquinone-based compounds, naphthoquinone-based compounds, phthalocyanine-based compounds and diimmonium-based compounds are preferable. Among these compounds, the phthalocyanine-based compounds and/or diimmonium-based compounds are preferable.

The diimmonium-based compounds are preferable because they have high absorption in the near-infrared region, particularly in the wavelength range of 900 to 1100 nm, have a broad absorption range, and have high transmittance in the visible range. The phthalocyanine-based compounds are preferable because they are relatively highly durable and have an absorption region of 800 to 900 nm and can thus be combined with the diimmonium compounds to make their absorption region broader in the near-infrared region. The phthalocyanine-based compounds can be used particularly preferably in combination with the diimmonium-based compounds, thereby attaining the advantages described above.

An organic dye (particularly a diimmonium-based compound) which was originally deteriorated significantly in an adhesive layer to which a near-infrared light absorbing agent was added can also be preferably used in combination with the specific block copolymer in the present invention, thereby improving durability.

Specifically, the diimmonium-based compounds include diimmonium compounds represented by the following formula (1):

[Formula 1]

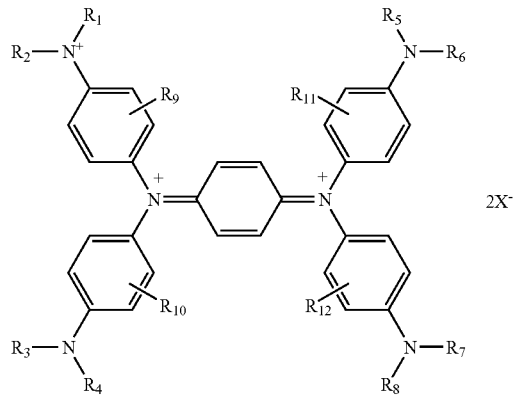

Formula (1)

wherein $R_1$ to $R_8$ may be the same or different and each represent a hydrogen atom, an alkyl group, an aryl group, an alkenyl group, an aralkyl group or an alkynyl group; $R_9$ to $R_{12}$ may be the same or different and each represent a hydrogen atom, a halogen atom, an amino group, a cyano group, a nitro group, a carboxyl group, an alkyl group, or an alkoxy group; when $R_1$ to $R_{12}$ are those to which a substituent can be bound, they may have a substituent; and $X^-$ represents an anion.

Specific examples of $R_1$ to $R_8$ in the formula (I) include optionally substituted alkyl groups such as a methyl group, an ethyl group, an n-propyl group, an iso-propyl group, an n-butyl group, an iso-butyl group, a tert-butyl group, an n-amyl group, an n-hexyl group, an n-octyl group, a 2-hydroxyethyl group, a 2-cyanoethyl group, a 3-hydroxypropyl group, a 3-cyanopropyl group, a methoxyethyl group, an ethoxyethyl group and a butoxyethyl group; optionally substituted aryl groups such as a phenyl group, a fluorophenyl group, a chlorophenyl group, a tolyl group, a diethylaminophenyl group, and a naphthyl group; optionally substituted alkenyl groups such as a vinyl group, a propenyl group, a butenyl group, and a pentenyl group; optionally substituted aralkyl groups such as a benzyl group, a p-fluorobenzyl group, a p-chlorophenyl group, a phenylpropyl group, and a naphthylethyl group. Among these groups, branched alkyl groups such as an iso-propyl group, an iso-butyl group and a tert-butyl group are preferable for increasing the pyrolysis point of diimmonium compounds and for improving durability. At least one of $R_1$ to $R_8$ is preferably a branched alkyl group, and more preferably all of $R_1$ to $R_8$ are branched alkyl groups.

$R_9$ to $R_{12}$ include hydrogen, fluorine, chlorine, bromine, a diethylamino group, a dimethylamino group, a cyano group, a nitro group, a methyl group, an ethyl group, a propyl group, a trifluoromethyl group, a methoxy group, an ethoxy group and a propoxy group.

$X^-$ includes monovalent inorganic anions, for example a halogen ion such as a fluorine ion, a chlorine ion, a bromine ion and an iodine ion, a thiocyanate ion, a hexafluoroantimonate ion, a perchlorate ion, a periodate ion, a nitrate ion, a tetra fluoroborate ion, a hexa fluorophosphate ion, a molybdate ion, a tungstate ion, a titanate ion, a vanadate ion, a phosphate ion and a borate ion. $X^-$ also includes monovalent organic acid anions, for example, an organic carboxylate ion such as an acetate ion, a lactate ion, a trifluoroacetate ion, a propionate ion, a benzoate ion, an oxalate ion, a succinate ion and a stearate ion, an organic sulfonate ion such as a methanesulfonate ion, a toluenesulfonate ion, a naphthalenemonosulfonate ion, a chlorobenzenesulfonate ion, a nitrobenzenesulfonate ion, a dodecylbenzenesulfonate ion, a benzenesulfonate ion, an ethanesulfonate ion and a trifluoromethanesulfonate ion, and an organic borate ion such as a tetraphenylborate ion and a butyltriphenylborate ion, as well as a sulfonylimidic acid ion such as a bischloromethanesulfonylimidic acid ion, a bisdichloromethanesulfonylimidic acid ion, a bistrichloromethanesulfonylimidic acid ion, a bisfluorosulfonylimidic acid ion, a bisdifluoromethanesulfonylimidic acid ion, a bistrifluoromethanesulfonylimidic acid ion and a bispentafluoroethanesulfonylimidic acid ion. Among these ions, a sulfonylimidic acid ions are preferable because these ions stabilize the diimmonium compound as an ionic compound by their strong electron-withdrawing property, resulting in improvement in durability. Among these ions, a bistrifluoromethanesulfonylimidic acid ion is particularly preferable. However, the present invention is not limited to those described above.

Some of these diimmonium compounds are available as commercial products, and for example, Kayasorb IRG-022 and IRG-068 manufactured by Nippon Kayaku Co., Ltd. can be preferably used.

The near-infrared light absorbing agents may be used alone or as a mixture of two or more thereof. The type and additive amount of the near-infrared light absorbing agent may be suitably determined depending on the absorption wavelength and absorption coefficient of the near-infrared light absorbing agent, color tone and required transmittance. For example, the near-infrared light absorbing agent may be added in an amount of about 0.001 to 15 mass % in the adhesive layer.

[Neon Light Absorbing Agent]

The neon light absorbing agent can be selected from arbitrary compounds that can absorb light in a wavelength range of 570 to 610 nm. The neon light absorbing agent is preferably that which absorbs light in a wavelength range of 570 to 610 nm (Ne light region) and simultaneously has sufficient light transmittance with the least absorption in the visible light wavelength range of 380 to 780 nm excluding the above wavelength range.

The neon light absorbing agent includes dyes conventionally used as dyes having an absorption maximum of light transmittance at least in the wavelength range of 570 to 610 nm, for example, cyanine-based, oxonol-based, methine-based and subphthalocyanine-based dyes or porphyrin-based dyes such as tetraazaporphyrin. In particular, tetraazaporphyrin is preferable for attaining durability and both absorption in the neon light region and visible light transparency.

The neon light absorbing agents may be used alone or as a mixture of two or more thereof. The type and additive amount of the neon light absorbing agent may be suitably determined depending on the absorption wavelength and absorption coefficient of the neon light absorbing agent, color tone and required transmittance. For example, the neon light absorbing agent may be added in an amount of about 0.001 to 15 mass % in the adhesive layer.

[Color Correction Dye]

The color correction dye is a dye for correcting a displayed image to that of a desired color tone (natural color or a color slightly deviated from natural color). As the color correction dye, organic and inorganic dyes can be used alone or as a mixture of two or more thereof.

Known dyes that can be preferably used as the color correction dye include dyes described in JP-A Nos. 2000-275432, 2001-188121, 2001-350013 and 2002-131530. Other examples of usable dyes include dyes absorbing visible light such as yellow light, red light and blue light, for example dyes based on anthraquinone, naphthalene, azo, phthalocyanine, pyromethene, tetraazaporphyrin, squarylium and cyanine.

The type and additive amount of the color correction dye may be suitably determined depending on the absorption wavelength and absorption coefficient of the color correction dye, color tone and required transmittance. For example, the color correction dye may be added in an amount of about 0.001 to 15 mass % in the adhesive layer.

In the present invention, the adhesive composition or the adhesive layer may contain not only the light absorbing agent used for the purpose of making display colors vivid by removing unnecessary color components emitted from a display device, but also a UV absorbing agent for preventing the light absorbing agent from being deteriorated with external UV light. The UV absorbing agent includes compounds having an absorption spectrum in the UV region of a wavelength of 380 nm or less, for example, organic UV absorbing agents such as benzotriazole-based agents such as 2-(2'-hydroxy-5'-methylphenyl)benzotriazole, benzophenone-based agents such as 2,4-dihydroxybenzophenone, salicylate-based agents such as phenylsalicylate, and benzoate-based agents such as hexadecyl-2,5-t-butyl-4-hydroxybenzoate, and inorganic UV absorbing agents such as titanium oxide, zinc oxide, cerium oxide, iron oxide and barium sulfate.

<Other Components>

The adhesive composition and the adhesive layer in the present invention may contain one or more additives such as a tackifier, a plasticizer, an antioxidant, a filler and a silane coupling agent insofar as the effect of the present invention is not impaired. In the adhesive composition and the adhesive layer in the present invention, a crosslinking agent such as an isocyanate compound may be contained insofar as the effect of the present invention is not impaired.

The tackifier includes, for example, rosin derivatives such as rosin ester, gum rosin, tall oil rosin, hydrogenated rosin ester, maleate rosin and disproportionated rosin ester; terpene-based resin based on terpene phenol resin or the like; (hydrogenated) petroleum resin, chromane-indene-based resin, hydrogenated aromatic copolymers, styrene-based resin, phenol-based resin and xylene-based resin. The plasticizer includes, for example, oligoacrylates or the like. The antioxidant includes a benzotriazole-based compound etc. The benzotriazole-based compound, when used in a place in direct contact with the electroconductive mesh layer, is preferable for preventing the electroconductive mesh layer from being oxidized and discolored.

The adhesive composition may contain a solvent described later.

<<Adhesive Layer>>

The adhesive layer of the present invention can be formed by an arbitrary method suited to the object. The adhesive layer is formed preferably by a method requiring no excessive temperature or pressure by using no or less harmful component causing deterioration of the light absorbing agent and the block copolymer in order to prevent deterioration of the light absorbing agent and the block copolymer. One of such methods include a method wherein the adhesive composition for optical filter according to the present invention is dissolved if necessary in a solvent, then applied or extruded onto a release film or a functional layer described later and dried if necessary to form the adhesive layer of the present invention.

The solvent in which the block copolymer as an essential component in the adhesive layer is dissolved and the light absorbing agent and other additives are dissolved or dispersed uniformly is not particularly limited insofar as it can uniformly dissolve or disperse the light absorbing agent and the block copolymer. For example, the solvent includes, but is not limited to, toluene, methyl ethyl ketone, methyl isobutyl ketone and ethyl acetate.

The method of coating a support with the adhesive composition having the light absorbing agent and the block copolymer dissolved or dispersed uniformly therein can make use of various coating systems such as dipping, spraying, brushing, Meyer bar coating, doctor blade coating, gravure coating, gravure reverse coating, kiss reverse coating, three-roll reverse coating, slit reverse die coating, die coating and comma coating.

The thickness of the adhesive layer of the present invention is selected suitably depending on the object and not particularly limited, but is usually selected such that the thickness reaches 10 to 5,000 μm at the time of drying. When the adhesive layer is used in bonding two or more functional layers or in attachment to a front glass plate of a display device, the thickness of the adhesive layer is preferably 10 to 50 μm at the time of drying. For the purpose of direct attachment to a front glass plate of a display device and simultaneously achieving high impact resistance to allow the adhesive layer to also function as an impact-resistant layer, the thickness of the adhesive layer is preferably 50 to 5,000 μm. The thickness is more preferably 75 to 3,000 μm, even more preferably 100 to 1,000 μm.

The adhesive layer of the present invention is a single layer for use as an adhesive layer but may, at the time of circulation, have a release film (e.g., silicone resin- or fluorine resin-coated PET) attached to one or both sides of the layer.

In the adhesive layer of the present invention, the type of the NIR absorbing agent, the content of the NIR absorbing agent in the adhesive layer, and the thickness of the adhesive layer are preferably regulated such that the absorption of near-infrared light, in terms of transmittance, in the wavelength range of 800 to 1100 nm is 30% or less, particularly 10% or less. It is particularly preferable that the transmittance at 825 nm is 20% or less, the transmittance at 850 nm is 20% or less, the transmittance at 880 nm is 5% or less, and the transmittance at 980 nm is 5% or less.

When the central wavelength of the Ne light region is 590 nm, the Ne light absorbing agent, the content of the Ne light absorbing agent in the adhesive layer, and the thickness of the adhesive layer are preferably regulated such that the light transmittance of the adhesive layer at 590 nm is 50% or less.

The adhesive layer of the present invention has adhesiveness in such a degree that the adhesive layer can be semipermanently used without peeling or slippage and can, after attachment, be peeled relatively easily from a flat and smooth surface, and the adhesion, to glass, of the coating film of 25 μm after drying is preferably 0.5 to 30 N/25 mm. The adhesion to glass can be measured by attaching the adhesive layer to sodium soda glass and then releasing it at 90° at a rate of 200 mm/min. according to a test in JIS Z0237-2000. The adhesion to glass is more preferably 1 to 20 N/25 mm, even more preferably 5 to 15 N/25 mm.

The adhesive layer of the present invention has excellent durability and hardly changes its adhesion even when used for a long time at high temperature under high humidity. Specifically, when a heat resistance test is conducted as shown below, the difference in the glass adhesion of the adhesive layer before and after being left for 500 hours in a high-temperature atmosphere (for example, ambient temperature 80° C., relative humidity 10% or less) or in a high-temperature high-humidity atmosphere (for example, ambient temperature 60° C., relative humidity 90%) is preferably not more than 10 N/25 mm. The glass adhesion of the adhesive layer after being left for 500 hours is preferably not less than 1 N/25 mm, more preferably not less than 5 N/25 mm.

The adhesive layer of the present invention is attached to an image display surface of a display device, and thus preferably has higher transparency and a haze of preferably 3 or less. The haze refers to a value measured by a method in accordance with JIS K7105-1981. Specifically, the adhesive layer is attached to a glass plate of 1.2 mm in thickness, and a readily adhering surface of a PET film (for example Cosmoshine A-4100 manufactured by Toyobo) is attached to the adhesive layer on the side opposite to the glass plate so as to overlap with the adhesive resin layer, whereby a sample for its haze measurement is prepared.

The adhesive layer of the present invention has optical filter functions excellent in durability, and thus hardly undergoes the change in spectral physical properties attributable to deterioration in the light absorbing agent even when used for a long time at high temperature under high humidity. Usually, the light absorbing agent in a high-temperature high-humidity environment undergoes a chemical reaction with, or a catalytic action by, a residual functional group or an atomic group in an adhesive molecule, thereby often changing its molecular structure (energy level) to cause a change in absorption spectrum. Such change in absorption spectrum often appears as a change in absorption spectrum in the visible light region in any of a visible light absorbing agent, a near-infrared light absorbing agent and a UV absorbing agent. For example, the diimmonium-based compound described above is originally colorless and transparent in the visible light region and has absorption in the near-infrared light region, but the change in absorption spectrum accompanying a change in molecular structure is observed to be more significant in the visible light region than in the near-infrared light region. Such change in absorption spectrum in the visible light region is a problem to be solved for any of the light absorbing agents that are used in an optical filter to be disposed on the front face of an image display device. By selection of the adhesive in the adhesive layer of the present invention, the change in absorption spectrum in the visible light region at high temperature in high humidity can be reduced to such a degree as to be not problematic practically. Specifically, when a heat resistance test is carried out as described below, both differences $\Delta x$ and $\Delta y$ in chromaticity (x, y) of the test sample before and after left in a high-temperature atmosphere are preferably 0.03 or less, more preferably 0.02 or less. When a moisture and heat resistance test is carried out as described below, both differences $\Delta x$ and $\Delta y$ in chromaticity (x, y) of the test sample before and after left in a high-temperature high-humidity atmosphere are preferably 0.03 or less, more preferably 0.02 or less.

First, the adhesive layer of the present invention is attached to glass (PD-200, thickness 2.8 mm, manufactured by Asahi Glass Co., Ltd.), then a PET film (A4100, thickness 50 μm, manufactured by Toyobo Co., Ltd.) is laminated on the adhesive layer, whereby a sample for durability test is prepared. The chromaticity (x, y) of the sample for durability test is measured before a durability test. The chromaticity can be measured using for example a spectrophotometer (UV-3100PC, manufactured by Shimadzu Corporation).

Then, the resulting sample for durability test is left for 1000 hours in a high-temperature atmosphere (for example, ambient temperature 80° C., relative humidity 10% or less) or in a high-temperature high-humidity atmosphere (for example, ambient temperature 60° C., relative humidity 90%) and then measured its chromaticity after the durability test in the same manner as described above. From the chromaticity (x, y) of the test sample before and after left in the high-temperature atmosphere or in the high-temperature high-humidity atmosphere, differences Δx and Δy in chromaticity (x, y) are determined. The chromaticity (x, y) used herein is prescribed by International Commission on Illumination (CIE).

When the total thickness of the adhesive layer of the present invention particularly at the time of drying is 50 to 5,000 μm, the adhesive layer preferably has impact resistance against a breaking energy of 0.5 J or more, preferably 0.6 J or more, in the following falling ball impact test. The impact resistance test is carried out using an impact test apparatus shown in FIG. 4, and breaking energy is measured when a steel ball 35 of 50.8 mm in diameter (mass 534 g) (Steel Ball for Ball Bearing prescribed in JIS B1501) is dropped from an electromagnet 34. By changing the height of drop of the steel ball, the breaking energy can be changed. As a test stand 31, a stainless steel plate is used. As a display front glass plate 32 on which the adhesive layer 33 of the present invention was laminated, a high strain point glass plate (trade name: PD-200, thickness 2.8 mm, manufactured by Asahi Glass Co., Ltd.) for example is mounted on the test stand 31. PD-200 is a front glass plate for plasma display, which is commonly used by plasma display makers.

The adhesive layer having optical filter functions according to the present invention is suitably used by integrating it in a display device, and how the adhesive layer is integrated is sometimes not limited, but the adhesive layer is particularly suitable as a layer used by attaching it directly to a glass plate disposed on the front face of a display device. The adhesive layer can be applied to any display devices without particular limitation, but can be particularly preferably used in a plasma display requiring many kinds of optical filter functions.

II. Composite Filter

The composite filter of the present invention is a composite filter having optical filter functions for direct attachment to a glass plate disposed on the front face of a display device, comprising the adhesive layer of the present invention laminated with one or more functional layers having one or more functions selected from an electromagnetic wave shielding function, an antireflection function, an antiglare function, a UV absorption function and a surface protection function.

The composite filter of the present invention comprises the adhesive layer of the present invention laminated with one or more functional layers, thereby endowing the composite filter not only with optical filter functions to allow it to have excellent adhesiveness, to hardly undergo the change in spectral characteristics attributable to deterioration in the light absorbing agent even when used for a long time, particularly at high temperature in high humidity, and to make spectral characteristics excellent in stability, but also with the functions of the laminated functional layers. In the composite filter of the present invention, the adhesive layer which is used always in mutual attachment of functional layers or in attachment of a functional layer to a front glass of a display device has optical filter functions, and therefore, the composite filter of the present invention as compared with the conventional composite filter can simplify its layer structure and enable weight saving and thinning, thereby simplifying the production process and reducing production costs.

In the composite filter of the present invention, each kind of functional layer laminated on the adhesive layer having optical filter functions according to the present invention may be one layer or two or more layers. Alternatively, two of the functions described above may be contained in one functional layer. A transparent substrate may be contained in the functional layers or separately.

In the composite filter of the present invention, one or more functional layers may be laminated on at least one side of the adhesive layer of the present invention, or one or more functional layers may be laminated on both sides of the adhesive layer of the present invention. Two or more adhesive layers of the present invention may be contained in the composite filter of the present invention.

The composite filter of the present invention preferably comprises the adhesive layer of the present invention formed on at least the outermost surface thereof, wherein the adhesive layer for direct attachment to a glass plate disposed on the front face of a display device is the adhesive layer of the present invention, but the adhesive layer of the present invention may be contained as an additional layer for mutual attachment of two or more functional layers or as only a layer for mutual attachment of two or more functional layers.

FIG. 1 is a schematic sectional view of one example of a laminate structure having a composite filter 10 in one embodiment of the invention attached to the front face of a plasma display panel 20. The composite filter 10 has a layer structure wherein an electromagnetic wave shielding layer 2, an adhesive layer 3 and an antireflective layer 4 are laminated in this order on one side of the adhesive layer 1 having optical filter functions according to the present invention. (Hereinafter, this laminate structure is referred to sometimes as "the adhesive layer 1/electromagnetic wave shielding layer 2/adhesive layer 3/antireflective layer 4".) The adhesive layer 3 may be the adhesive layer 1 having optical functional functions according to the present invention. When a plurality of the adhesive layers 1 of the invention are present in the composite filter 10, the adhesive layers 1 may be different in thickness from one another. When a plurality of the adhesive layers 1 of the invention are present in the composite filter 10, necessary optical filter functions and impact resistance to be supplied can be regulated suitably by the functions attained by combining a plurality of the layers.

The layer structure of the optical filter according to the present invention is not particularly limited, but specific examples include the adhesive layer/electromagnetic wave shielding layer, the adhesive layer/antireflective layer, the adhesive layer/antiglare layer, the adhesive layer/UV absorbing layer, the adhesive layer/surface protective layer, the adhesive layer/electromagnetic wave shielding layer/antireflective layer, the adhesive layer/electromagnetic wave shielding layer/antiglare layer, the adhesive layer/electromagnetic wave shielding layer/UV absorbing layer, the adhesive layer/electromagnetic wave shielding layer/surface protective layer, the adhesive layer/electromagnetic wave shielding layer/UV absorbing layer/antireflective layer, and the adhesive layer/electromagnetic wave shielding layer/UV absorbing layer/antiglare layer. The adhesive layer and/or transparent substrate may be contained between any two functional layers mentioned above. As the adhesive layer used herein, the adhesive layer of the present invention may be used. In the composite filter of the present invention, a near-infrared light absorbing layer, a neon light absorbing layer, or a color correction layer each of which supplies an optical filter function may further be disposed separately in addition to the adhesive layer having optical filter functions according to the present invention.

The composite filter in one preferable embodiment of the invention is a composite filter having an electroconductive mesh layer using a metal, and an adhesive layer, formed in this order on one side of a transparent substrate film and a surface protective layer formed on the other side of the transparent substrate film, wherein the adhesive layer comprises three kinds of light absorbing agents, that is, a light absorbing agent having an absorption maximum at least at a wavelength of 800 to 1100 nm as a near-infrared light absorbing agent, a light absorbing agent having an absorption maximum at least at 570 to 610 nm as a neon light absorbing agent, and a light absorbing agent having an absorption maximum at least at 380 to 570 nm or 610 to 780 nm as a color correcting light absorbing agent, wherein the composite filter has at least an electromagnetic wave shielding function, a near-infrared light absorption function, a neon light absorption function, a color correction function and a surface protection function, and wherein the adhesive layer comprises, as the adhesive resin, a multiblock copolymer having, in its molecule, at least a triblock structure wherein one polymer block (A1) comprising acrylic ester units, and two polymer blocks (B1) different in structure from the polymer block (A1) and comprising (meth)acrylic ester units, are bound to one another, or a triblock structure wherein two polymer blocks (A1) comprising acrylic ester units, and one polymer block (B1) different in structure from the polymer block (A1) and comprising (meth) acrylic ester units, are bound to one another, and having a weight average molecular weight of 50,000 or more and a molecular weight distribution (Mw/Mn) of less than 1.5 (hereinafter, the composite filter having the aforesaid constitution is referred to sometimes as "simple filter").

Figure 2:
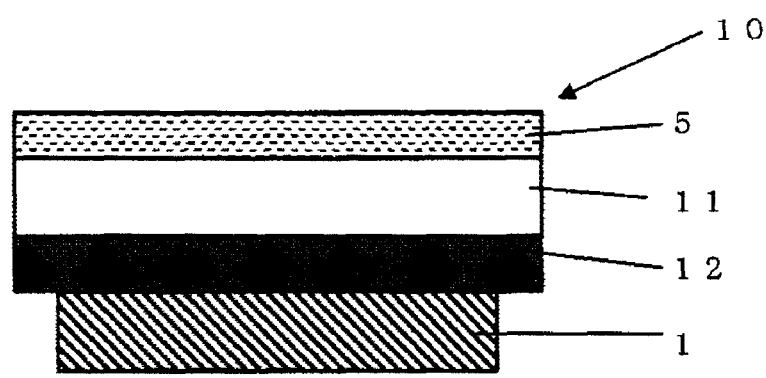
FIG. 2 is a sectional view of another example of the composite filter of the present invention.

A sectional view of one example of the composite filter of the present invention is conceptually shown in FIG. 2. The composite filter 10 shown in FIG. 2 has an electroconductive mesh layer 12 using a metal, and an adhesive layer 1, formed in this order on one side (on the side of a display; also referred to hereinafter as backside) of a transparent substrate film 11, wherein the adhesive layer 1 comprises three kinds of light absorbing agents, that is, a near-infrared light absorbing agent, a neon light absorbing agent, and a color correcting light absorbing agent added thereto, and the transparent substrate film 11 contains a UV absorbing agent, and a surface protective layer 5 is formed on the other side (the side of an observer; also referred to hereinafter as surface) of the transparent substrate film 11. In addition, in the adhesive layer 1, a specific adhesive durable to the metal etc. of the electroconductive mesh layer 12 is used.

FIG. 2 is a conceptual sectional view of the composite filter 10 wherein the adhesive layer 1 is formed not on the whole surface of the electroconductive mesh layer 12 but partially in a patterned form by intermittent coating or the like so as to expose a part (earthing area 122) of the electroconductive mesh layer 12, as described later by reference to FIG. 3.

FIG. 2 shows an example of the transparent substrate film 11 containing a UV absorbing agent, and thus the composite filter also has a UV absorption function. A UV absorption function may be supplied suitably to the composite filter so as to adjust the filter to its intended usage.

Hereinafter, the functional layer, the adhesive layer and the transparent substrate used in the present invention are described. The following illustration of the respective layers applies not only to the form of the "simple filter", but also to the composite filters having other constitutions and combinations.

<Electromagnetic Wave Shielding Layer>

The electromagnetic wave shielding layer has a function of shielding electromagnetic waves generated from a plasma display or the like.

Various forms of the electromagnetic wave shielding layer known in the art can be applied, and this layer can be designed to be a transparent continuous (mesh opening-free) thin film of silver, ITO (indium tin oxide) or ATO (antimony doped tin oxide) besides an electroconductive mesh layer described later. From the viewpoint of satisfying both transparency and electromagnetic wave shielding property, the electromagnetic wave shielding layer is preferably an electroconductive mesh layer made of a metal or the like, and hereinafter, the electromagnetic wave shielding layer is described mainly by reference to an example of the electroconductive mesh layer.

The electromagnetic wave shielding layer used preferably in the present invention has a laminate structure having a transparent substrate 1 and an electroconductive mesh layer 12 laminated in this order as shown in FIG. 1.

(Electroconductive Mesh Layer)

The electroconductive mesh layer 12 is electrically conductive to serve as a layer having an electromagnetic wave shielding function, wherein the layer itself is opaque but has a large number of openings in the form of a mesh, thus satisfying electromagnetic wave shielding performance and optical transparency.

The electroconductive mesh layer is usually based on a metal layer, and usually further contains an electroconductive blackened layer and anticorrosive layer, or further contains an electroconductively treated layer as a constituent layer when the electroconductive mesh layer is formed by electrolytic plating described later.

A non-electroconductive layer may further be formed on the whole surface or a partial surface of the electroconductive mesh layer. The non-electroconductive layer is for example a non-electroconductive anticorrosive layer or blackened layer. However, when an anticorrosive layer or a blackened layer is electroconductive, such layer is included in the electroconductive mesh layer in the present invention. Such electroconductive layer serves as a constituent layer of the electroconductive mesh layer.

(Shape of the Mesh)

The shape of the mesh is arbitrary and is not particularly limited, but the shape of each of openings in the mesh is typically square. The shape of the openings is for example in the form of triangle such as regular triangle, quadrangle such as regular square, rectangle, rhombus and trapezoid, polygon such as hexagon, or circle, ellipse or the like. The mesh has a plurality of opening parts in such shape, and the portion thereof between opening parts serves as a line part dividing the opening parts, and the line part is usually a line having the same width, and the opening parts or the portion between the opening parts are usually identical in shape and size on the whole area.

Specifically, the width (line width) of the line part between openings is 100 μm or less, more preferably 50 μm or less, from the viewpoint of opening rate and non-visibility. The lower limit of the line width is preferably 5 μm or more, from the viewpoint of securing an electromagnetic wave shielding function and of preventing breakage.

The bias angle (angle between the line part of the mesh and the periphery of the composite filter) of the mesh region may be suitably established to be the angle at which a moire hardly appears, in consideration of the pixel pitch and emission property of a display to which it is applied.

The opening width of the opening part, that is defined as [(line pitch) minus (line width)], is 100 μm or more, more preferably 150 μm or more. From the viewpoint of securing an electromagnetic wave shielding function, the opening width is preferably 3000 μm or less. The line width and opening width are established preferably such that from the viewpoint of light permeability and for allowing bubbles to hardly remain in openings at the time of formation of the transparent protective layer, the opening rate is preferably 60% or more, and from the viewpoint of securing an electromagnetic wave shielding function, the opening rate is preferably 97% or less, wherein the opening rate=[(opening width)²/(line pitch)²]×100%.

(Earthing Area and Mesh Area)

Figure 3:
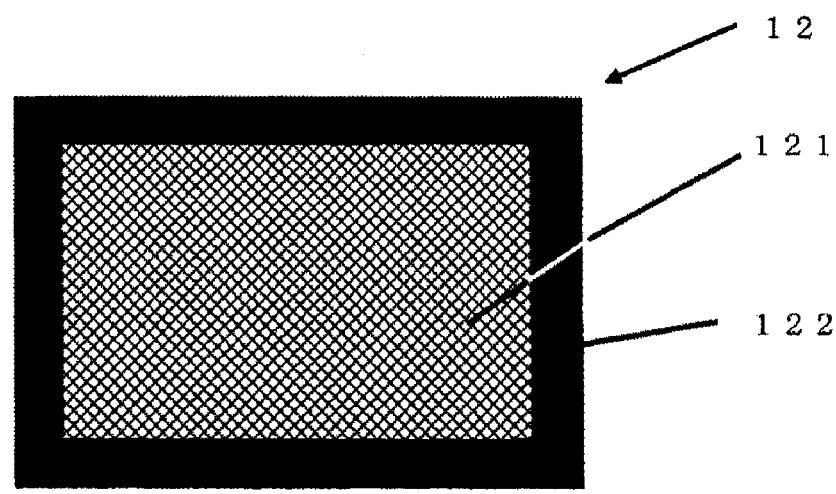
FIG. 3 is a plane view of one example of an electromagnetic wave shielding sheet used in the present invention.

For easy earthing, the electroconductive mesh layer 12 is more preferably a layer provided in the plane direction thereof with an earthing area 122 in addition to the mesh area 121, as shown in the electroconductive mesh layer 12 illustrated conceptually in the plane view of FIG. 3. The earthing area can be formed on the whole or a part of the periphery of an image display area, so as not to interfere with image display. The mesh area is an area covering the whole of the image display area of a display to which the composite film is applied. The earthing area is an area for earthing. The image display area refers to at least the region of a display that substantially displays an image (substantial image display area), but may also refer to the area that for convenience, includes the whole of the inside of an outer frame of the display when viewed from an observer. This is because when there is a black region (bordering) inside of the frame and outside of the substantial image display area, this region is essentially outside of the image display area, but when viewed, brings discomfort if its appearance is different from the substantial image display area.

In the earthing area, a mesh is substantially unnecessary, but for the purpose of preventing warpage of the earthing area, a meth consisting of the opening part may be present.

The thickness of the electroconductive mesh layer may not always be the same between the mesh area and the earthing area, but is usually the same between the mesh area and the earthing area. From the viewpoint of the electromagnetic wave shielding function, the thickness of the electroconductive mesh layer is 1 to 20 μm in at least the mesh area, more preferably 1 to 5 μm, still more preferably 1 to 3 μm for a thinner film, from the viewpoint of excellent visibility of an image (when viewed obliquely), less entrainment of bubbles in the opening part due to a step between the opening part and the line part at the time of formation of the surface protective layer, and good yield due to a shorter process.

From the viewpoint of a step between the opening part and the line part, the height of the line part in the mesh area of the electroconductive mesh layer is equal to the thickness of the electroconductive mesh layer when the line part is composed exclusively of the electroconductive mesh layer, but when a non-electroconductive blackened layer and a non-electroconductive anticorrosive layer for example are also formed, the height of the line part is regarded as the total thickness of the electroconductive mesh layer, the non-electroconductive blackened layer and the non-electroconductive anticorrosive layer.

[Method of Forming the Electroconductive Mesh Layer]

In the present invention, the material and the method used in forming the electroconductive mesh layer having a mesh area and an earthing area are not particularly limited, and any materials and methods for forming known electromagnetic wave shielding sheets can be suitably used.

The method of forming the electroconductive mesh layer having a mesh area includes, but is not limited to, the following methods (1) to (4):

(1) a method wherein an electroconductive ink is printed in patterns on a transparent substrate film and a metal is plated on the formed electroconductive ink layer (for example, JP-A No. 2000-13088);

(2) a method wherein an electric conductive ink or a photosensitive coating liquid containing a catalyst for chemical plating is entirely applied on a transparent substrate, the applied layer is formed into a mesh by a photolithography method, and a metal plating is applied on the mesh (see, for example, "Photosensitive Catalyst for Electro-less Plating with Fine Pattern", Advanced Materials Research Group New Technology Research Laboratory Sumitomo Osaka Cement Co., Ltd., on Sumitomo Osaka Cement Co., Ltd. Web Page, http://www.socnb.com/product/hproduct/display.html, accessed on Jan. 7, 2003.);

(3) a method wherein a metal foil is laminated via an adhesive on a transparent substrate film, and the metal foil is formed in the form of a mesh by photolithography (for example, JP-A No. 11-145678); and (4) a method wherein a metal thin film is formed by sputtering etc. on one side of a transparent substrate film to form an electroconductively treated layer thereon, then a metal layer is formed as a metal plated layer on the transparent substrate film by electrolytic plating, and the metal plated layer and the electroconductively treated layer on the metal plated transparent substrate film are formed in the form of a mesh by photolithography (for example, Japanese Patent No. 3502979 and JP-A No. 2004-241761).

Among these methods, the method (4) is particularly preferable because the electroconductive mesh layer can be formed into a thin film having a thickness of 5 μm or less and because of excellent visibility of an image (when viewed obliquely), less entrainment of bubbles at the time of formation of the surface protective layer, good yield due to a shorter process, and lower costs. Accordingly, the method of forming the electromagnetic mesh layer on a transparent substrate film by the method (4) is hereinafter described in detail.

In this method, an electroconductive layer in a state before formation of an electroconductive mesh layer with a mesh still not formed thereon is formed on one side of a transparent substrate film, and the electroconductive layer is processed to form a mesh thereby serving as an electroconductive mesh layer.

[Electroconductively Treated Layer]

Because the transparent substrate film used is an electrically insulating resin film, the electroconductively treated layer is provided as a layer for securing the necessary electrical conductivity of the surface of the film by electroconductive treatment so as to allow a metal plated layer to be formed thereon by electrolytic plating. The method of electroconductive treatment may be any known method of forming a thin film of an electroconductive material. The electroconductive material consists of a metal such as gold, silver, copper, iron, nickel or chromium, or an alloy of these metals (for example, a nickel-chromium alloy). Alternatively, the electroconductive material may be a transparent metal oxide such as tin oxide, ITO, ATO or the like. The electroconductively treated layer can be formed from these materials by thin-layer forming methods known in the art, such as a vacuum deposition method, a sputtering method and an electroless plating method. The electroconductively treated layer may be a single layer or multiple layers (for example, a laminate of a nickel-chromium alloy layer and a copper layer). Because it is only necessary to obtain electrical conductivity required to plate, the thickness of the electroconductively treated layer is preferably as very thin as 0.001 to 1 μm in order to make the electroconductive mesh layer thin as a whole.

(Metal Plated Layer)

The metal plated layer is formed on the surface of the electroconductively treated layer by electrolytic plating. The material of the metal plated material may be a material attaining electrical conductivity necessary for the electromagnetic wave shielding function and includes, for example, a metal such as gold, silver, copper, iron, nickel and chromium or an alloy of these metals. Among these materials, those preferable from the viewpoint of easy plating and electrical conductivity include copper and a copper alloy. The metal plated layer may be a single layer or multiple layers.

For attempting at forming a thin film of 5 μm or less in thickness in at least the mesh area of the electroconductive mesh layer by the method (4) described in detail, the thickness of the metal plated layer is preferably thickness enabling formation of a thin electroconductive mesh layer so that the total thickness of the electroconductively treated layer and the metal plated layer is preferably 5 μm or less.

[Blackened Layer]

The blackened layer is disposed if necessary on at least one side of the metal plated layer. The blackened layer is disposed for the purpose of external-light absorption, image-visibility improvement and contrast improvement. The blackened layer can be provided by roughening the surface of the metal plated layer and/or conferring light absorption (blackening) on the whole visible light region.

The method of disposing a blackened layer includes various methods such as a method of forming a metal oxide or a metal sulfide. When the surface on which a blackened layer is to be disposed consists of iron, the surface is exposed to steam usually at a temperature of about 450 to 470° C. for 10 to 20 minutes to form an oxide film (blackening film) of about 1 to 2 μm in thickness, or the blackened layer may be an oxide film (blackened film) by chemical treatment with conc. nitric acid or the like. When the surface on which a blackened layer is to be disposed consists of copper, the blackened layer is preferably a particle layer of a copper-cobalt alloy, a nickel sulfide layer, a copper oxide layer or the like.

The surface on which a blackened layer is disposed is at least in the observation side, but a blacking layer may also be disposed in the side of the adhesive layer (that is, the display side) to further improve the visibility of an image by absorbing a stray light emitted from the display.

When an electromagnetic mesh layer is formed by electrolytic plating and a blackened layer is disposed on the layer at the side of the transparent substrate film, the following methods A and B for example can be used.

Method A: A method wherein an electroconductively treated layer to be disposed on a transparent substrate film is formed as a black layer which is then used as a blackened layer also serving as an electroconductively treated layer on which a metal plated layer is to be formed.

Method B: A method wherein an electroconductively treated layer is formed as a transparent electroconductively treated layer of ITO or the like on a transparent substrate film, then an electroconductive blackened layer is formed on the transparent electroconductively treated layer, and a metal plated layer is formed on the electroconductive blackened layer of the electroconductively treated layer consisting of the transparent electroconductively treated layer and the electroconductive blackened layer.

The black density of the blackened layer is preferably 0.6 or more. Using COLOR CONTROL SYSTEM GRETAG SPM100-11 (manufactured by Kimoto Co., Ltd.), a test specimen after white calibration is measured for its black density at an observation view angle of 10° with an observation light source of D50 and density standard ANSIT set as a lighting type. The light reflectance of the blackened layer is preferably 5% or less. The light reflectance is measured with a haze meter HM150 (manufactured by Murakami Color Research Laboratory) in accordance with JIS-K7105.

The black density may be expressed in terms of reflection value Y determined with a color-difference meter, in place of the aforementioned reflectance measurement. In this case, the black density is preferably 10 or less in terms of value Y.

(Anticorrosive Layer)

Further, an anticorrosive layer is disposed preferably so as to cover the surface of the metal plated layer or the blackened layer. At least the mesh area on the surface of (the metal plated layer or the blackened layer in) the electroconductive mesh layer will be covered finally with an adhesive layer or a functional layer, but has been exposed in the production process before formation of the adhesive layer or the functional layer. Accordingly, an anticorrosive layer is disposed for preventing rust and preventing the blackened layer from being chipped or deformed. For the object described above, the anticorrosive layer is disposed preferably on at least the blackened layer.

For example, an oxide of nickel, zinc and/or copper or a chromate-treated layer can be used as the anticorrosive layer. The method of forming an oxide of nickel, zinc and/or copper may be a known plating method. The thickness of the anticorrosive layer is about 0.001 to 1 μm, preferably 0.001 to 0.1 μm, to realize the object and make the layer as thin as possible to avoid excessive performance.

(Formation of a Mesh)

Now, the process of forming an electroconductive mesh layer by forming a mesh, by photolithography, on the electroconductive layer disposed as described above on a transparent substrate film (the substance having the electroconductive layer laminated on a transparent substrate film is also referred to hereinafter as "laminate") is described.

First, a resist layer is disposed on the surface of the electroconductive layer laminated on a transparent substrate film and is then patterned in the form of a mesh, and the electroconductive layer in a portion not covered with the resist layer is removed by etching, and then the resist layer is removed therefrom, thereby giving an electroconductive mesh layer having a mesh area formed thereon. In this method, existing facilities can be used and many of the steps can be continuously carried out to achieve production excellent in quality, production efficiency, yield and cost.

The step of forming a mesh by photolithography is conducted preferably by processing (rewinding processing or roll-to-roll processing) a roll-shaped laminate that was rolled up continuously in a continuous belt-shaped form. Delivery of the laminate is carried out continuously or intermittently, and the respective steps of masking, etching and resist release can be carried out in a stretched state without looseness.

In masking, for example, a photo conductive resist is first applied onto the electroconductive layer, then dried, irradiated with a light via a photomask having a predetermined mesh pattern, developed with water, and subjected to film hardening treatment followed by baking. Both negative and positive photosensitive resists may be used. In the case of the negative resist, a mesh pattern of a pattern plate shall be a transparent positive in the line part. In the case of the positive resist, on the other hand, a mesh pattern of a pattern plate is a transparent negative in the opening part. The exposure pattern is a pattern having a desired mesh shape and has a pattern of at least the mesh area. If necessary, the exposure pattern also has a pattern of the earthing area around the mesh area.

Formation of the resist by rewinding processing is carried out by delivering the continuous belt-shaped laminate continuously or intermittently while applying a resist such as casein, PVA or gelatin by a method such as dipping, curtain coating, flow coating etc. onto the surface of the electroconductive layer on which a mesh area is to be formed. To improve workability, the resist may be formed with a dry film resist in place of coating. A casein resist for example is baked at 200 to 300° C., but the temperature is preferably lower for preventing warpage of the laminate.

When etching is continuously conducted, a solution of ferric chloride or cupric chloride usable in easy recycling is preferably used in etching. The etching step is substantially the same step as in facilities for production of color-TV CRT shadow masks for etching a continuous belt-shaped steel material, particularly a thin plate of 20 to 80 μm in thickness. After etching, the resist may be washed with water, released by an alkaline solution, cleaned and dried.

The surface resistivity of the electroconductive mesh layer used in the invention as described above is preferably in the range of $10^{-6}$ Ω/sq. to 5 Ω/sq., more preferably in the range of $10^{-4}$ Ω/sq. to 3 Ω/sq. Generally, the electromagnetic wave shielding property can be determined by measuring surface resistivity, and as the surface resistivity of the electroconductive mesh layer is decreased, the layer can be assumed to be more excellent in electromagnetic wave shielding property. The surface resistivity is measured with a surface resistivity measuring instrument Loresta GP (manufactured by Dia Instrument) by a method described in JIS K7194 "Testing method for resistivity of conductive plastics with a four-point probe array".

(Transparent Substrate)

The transparent substrate is one of the layers constituting the electromagnetic wave shielding layer, to serve as a substrate on which the electroconductive mesh layer is laminated via an adhesive layer if necessary.

The transparent substrate 11 is a layer for reinforcing the electroconductive mesh layer poor in mechanical strength, and may be a layer that further has other functions such as UV absorption function. Accordingly, the transparent substrate film may be selected depending on functions such as UV absorption function together with mechanical strength and light permeability, as well as on other performance such as considered desirable, such as heat resistance. As the transparent substrate, a resin film (or a resin sheet) as a transparent substrate film is used.

The transparent resin used as a material of the resin film includes, for example, polyester-based resins such as polyethylene terephthalate, polybutylene terephthalate, polyethylene naphthalate, a terephthalic acid-isophthalic acid-ethylene glycol copolymer and a terephthalic acid-cyclohexane dimethanol-ethylene glycol copolymer; polyamide-based resins such as nylon 6; polyolefin-based resins such as polypropylene, polymethylpentene and a cycloolefin polymer; acrylic resins such as polymethyl methacrylate; styrene-based resins such as polystyrene and a styrene-acrylonitrile copolymer; cellulose-based resins such as triacetyl cellulose; and polycarbonate resins.

These resins may be used alone or as a mixture of plural kinds of resins (including a polymer alloy), and the transparent substrate is used as a single layer or as a laminate of two or more layers. The resin film is preferably a uniaxially or biaxially stretched film, from the viewpoint of mechanical strength.

The thickness of the transparent substrate may be selected basically depending on intended use and is not particularly limited, but is usually 12 to 1000 μm, preferably 50 to 500 μm, more preferably 50 to 200 μm. When the transparent substrate has thickness in such range, the substrate can have mechanical strength enough to prevent warpage, loosening and breakage and can be supplied in the form of a continuous sheet to facilitate processing.

In the present invention, the transparent substrate refers to what is called a resin plate in addition to a resin film (including a resin sheet). However, the transparent substrate is preferably thinner, from the viewpoint of thinning the composite filter by preventing the total thickness of a laminate of films for NIR absorption, Ne light absorption and color correction from increasing due to lamination of the respective layers.

In this respect, as the form of the transparent substrate, a resin film is preferable to a resin plate. From the viewpoint of transparency, heat resistance, cost etc., the resin film is particularly preferably a polyester-based resin film such as polyethylene terephthalate and polyethylene naphthalate, most preferably a biaxially stretched polyethylene terephthalate film. The transparent substrate preferably has higher transparency and is preferably a light-permeable film having a visible light transmittance of 80% or more.

The transparent substrate film used in the present invention may have a UV absorption function. In this case, the transparent substrate film is constituted by kneading a UV absorbing agent into a resin of the transparent substrate film and/or by disposing a UV absorbing agent-containing surface coating layer as a part of the layers constituting the transparent substrate film. The surface of the substrate film on which a surface coating layer is disposed may be one side or both sides thereof.

In the embodiment of the simple filter wherein the transparent substrate film is to be provided on one side thereof with a surface protective layer, the UV absorbing agent-containing surface coating layer may be formed as a layer serving both as a surface coating layer and a surface protective layer on the side of forming the surface protective layer.

The UV absorbing agent that can be used include known materials such as the above-mentioned materials including organic compounds consisting of benzotriazole, benzophenone or the like and inorganic compounds consisting of particulate zinc oxide, cerium oxide or the like.

The UV absorbing agent-containing surface coating layer (UV absorbing layer) may be formed by any known methods for example by applying a composition having such a UV absorbing agent added to a resin binder. The resin of the resin binder includes thermoplastic resins such as a polyester resin, a polyurethane resin, an acrylic resin etc., thermosetting resins or ionizing radiation curing resins consisting of monomers such as epoxy, acrylate, methacrylate etc. or prepolymers thereof, and curable resins such as a two-pack curable urethane resin, etc.

The resin of the transparent substrate can, if necessary, contain known additives such as a filler, a plasticizer, an antistatic agent in such a range as not to depart from the effect of the invention.

The transparent substrate may be subjected to known treatment for making it easily adhesive, such as corona discharge treatment, plasma treatment, ozone treatment, flame treatment, primer treatment, preheating treatment, dust removal treatment, vapor deposition treatment, and alkali treatment if necessary.

(Bonding Agent Layer)

A bonding agent layer, though not shown in the electromagnetic wave shielding layer in FIG. 1, may be used in bonding the electromagnetic mesh layer to the transparent substrate, depending on the forming method. As long as the bonding agent layer is a layer that can bond the electromagnetic mesh layer to the transparent substrate, its type and the like are not particularly limited. It is preferable in the present invention that because a metal foil constituting the electromagnetic mesh layer and the transparent substrate are attached to each other via the bonding agent layer and then the metal foil is etched in the form of a mesh, the bonding agent layer also has etching resistance. Specific examples include an acrylic resin, a polyester resin, a polyurethane resin, an epoxy resin and a polyurethane ester resin. The bonding agent layer used in the present invention may be of UV-curing or heat-curing type. From the viewpoint of adhesiveness to the transparent substrate, the bonding agent layer is made preferably of an acrylic resin or a polyester resin.

A metal foil for forming the electroconductive mesh layer can be bonded via the bonding agent layer to the transparent substrate by dry lamination method and the like. The thickness of this bonding agent layer is preferably in the range of 0.5 to 50 µm, particularly preferably 1 to 20 µm. By so doing, the transparent substrate and the electroconductive mesh layer can be strongly bonded to each other, and during etching in forming the electroconductive mesh layer, the transparent substrate can be prevented from undergoing the influence of an etching solution of iron chloride or the like.

<Antireflective Layer>

As a means of reducing the reflection of background by mirror reflection of external light on the surface of an image display device, image whitening and deterioration in image contrast, a so-called antiglare layer and/or a so-called antireflective layer is preferably formed as the outermost layer of the composite filter of the present invention. The antiglare layer employs a method in which the antiglare layer acts like frosted glass to scatter or diffuse a light thereby blurring away a background image caused by external light.

The latter antireflective layer is a so-called narrowly-defined antireflective layer, which employs a method in which a material with a high refractive index and a material with a low refractive index are laminated alternately thereby forming a multi-coated layer so that a low refractive index layer forms on the outermost surface, and thereby cancelling, by interference, lights reflected on the respective layer interfaces, thus suppressing reflection on the surface of a display and achieving an excellent antireflective effect.

This antireflective layer is formed usually by a gaseous phase method of forming a film for example by alternately depositing a material with a low refractive index, typically $MgF_2$ or $SiO_2$, and a material with a high refractive index, such as $TiO_2$ and $ZrO_2$.

For improving the antireflective effect, the refractive index of the layer with a low refractive index is preferably 1.45 or less. The material having such property includes, for example, low-reflective inorganic materials wherein fine particles of inorganic materials such as LiF (refractive index n=1.4), $MgF_2$ (refractive index n=1.4), $3NaF.AlF_3$ (refractive index n=1.4), $AlF_3$ (refractive index n=1.4) $Na_3AlF_6$ (refractive index n=1.33) and $SiO_2$ (refractive index n=1.45) are contained in an acrylic resin, an epoxy resin etc., as well as low-reflective organic materials such as fluorine- and silicone-based organic compounds, thermoplastic resins, thermosetting resins and radiation-curable resins.

Further, a material wherein a sol having 5 to 30 nm of superfine silica particles dispersed in water or an organic solvent is mixed with a fluorine-based film-forming agent can also be used. The sol having 5 to 30 nm of superfine silica particles dispersed in water or an organic solvent includes a known silica sol obtained by condensing active silicic acid by a method of dealkalizing an alkali metal ion in an alkali silicate salt by ion exchange or the like or a method of neutralizing an alkali silicate salt with a mineral acid, as well as a known silica sol obtained by hydrolyzing and condensing an alkoxysilane in the presence of a basic catalyst in an organic solvent, and a silica sol in an organic solvent (organosilica sol) obtained by replacing water in the above aqueous silica sol with an organic solvent by a distillation method or the like. These silica sols can be used in both an aqueous solvent and an organic solvent. In production of the silica sol in an organic solvent, complete replacement of water with an organic solvent is not necessary. The silica sol contains 0.5 to 50 mass % of $SiO_2$ as solids. The structure of superfine silica particles in the silica sol can have various forms such as sphere, needle, plate. The film-forming agent that can be used includes an alkoxysilane, a metal alkoxide, metallic salt hydrolysates, and fluorine-modified polysiloxane.

The low refractive index layer can be obtained by diluting the above-described materials for example in a solvent, then disposing the resulting liquid on a high refractive index layer by a wet coating method such as spin coating, roll coating and printing or by a gaseous phase method such as vacuum deposition, sputtering, plasma CVD and ion plating, and drying it, followed by curing thereof with heat or a radiation (in the case of UV ray, the above-mentioned photopolymerization initiator is used).

Formation of the high refractive index layer is carried out using by a binder resin with a high refractive index for increasing the refractive index and/or by adding superfine particles with a high refractive index to the binder resin. The refractive index of the high refractive index layer is preferably in the range of 1.55 to 2.70.

The resin used in the high refractive index layer can be an arbitrary resin that is transparent, and thermosetting resins, thermoplastic resins and radiation (e.g. UV ray) curing resins can be used. The thermosetting resins that can be used include a phenol resin, a melamine resin, a polyurethane resin, an urea resin, a diallyl phthalate resin, a guanamine resin, an unsaturated polyester resin, an aminoalkyd resin, a melamine-urea co-condensed resin, a silicon resin and a polysiloxane resin, and if necessary a crosslinking agent, a curing agent such as a polymerization initiator, a polymerization accelerator, a solvent, a viscosity regulating agent and the like can be added to these resins.

The superfine particles with a high refractive index include, for example, those also attaining a UV shielding effect, such as fine particles of ZnO (refractive index n=1.9), $TiO_2$ (refractive index n=2.3 to 2.7) or $CeO_2$ (refractive index n=1.95) and those endowed with an antistatic effect to prevent dust attachment, such as fine particles of antimony-doped $SnO_2$ (refractive index n=1.95) or ITO (refractive index n=1.95). Other fine particles include those of $Al_2O_3$ (refractive index n=1.63), $La_2O_3$ (refractive index n=1.95), $ZrO_2$ (refractive index n=2.05) and $Y_2O_3$ (refractive index n=1.87). These fine particles are used alone or as a mixture thereof, and a colloid thereof dispersed in an organic solvent or water is preferable in terms of dispersibility, and its particle size is preferably 1 to 100 nm, more preferably 5 to 20 nm, from the viewpoint of the transparency of a coating film.

The high refractive index layer can be disposed by diluting the above-described materials for example in a solvent, then disposing the resulting liquid on a substrate by a method such as spin coating, roll coating or printing, and drying it, followed by curing thereof with heat or a radiation (in the case of UV ray, the above-mentioned photopolymerization initiator is used).

From the viewpoint of conferring a UV shielding function on the antireflective layer, a UV absorbing agent may be contained in the antireflective layer.

<Antiglare Layer>

The antiglare layer (abbreviated to AG layer) is basically a layer whose light entrance face is roughened to scatter or diffuse an external light. For this roughening treatment, there is a method of roughening the surface of a substrate directly by sandblasting or embossing to form minute unevenness, a method of providing a roughened layer by coating the surface of a substrate with a coating film wherein inorganic fillers such as silica or an organic filler such as resin particles are contained in a resin binder to be cured with a radiation and/or heat, and a method of forming a porous film having a sea-island structure on the surface of a substrate. Because the surface layer is desired to have surface strength, a curable acrylic resin, or an ionizing radiation-curing resin similar to that of the hard coat layer, is preferably used as the resin of the resin binder.

<UV Absorbing Layer>

In the present invention, the UV absorbing layer is preferably a layer that is disposed on the observation side of the adhesive layer as a layer independent of the adhesive layer, in order to prevent the deterioration of the light absorbing agent contained in the adhesive layer of the present invention. The UV absorbing layer may be either a layer prepared by adding a UV absorbing agent to another functional layer, thereby acting not only as the UV absorbing layer but also as another functional layer, or an independent layer. The UV absorbing agent used in the functional layer may be the same UV absorbing agent as described above in the adhesive layer of the present invention. A binder resin used when the UV absorbing layer is disposed an independent layer includes a polyester resin, a polyurethane resin, an acrylic resin, an epoxy resin. A method of drying and curing the binder resin includes a drying solidification method using drying a solvent (or a dispersion medium) from a solution (or an emulsion), a curing method utilizing polymerization or crosslinking reaction with energy such as heat, UV ray, electron beam or the like, and a curing method utilizing a reaction such as crosslinkage, polymerization between a functional group such as a hydroxyl group, an epoxy group in the resin and an isocyanate group in the curing agent.

It is also possible to use commercially available UV filters such as Sharp Cut Filter SC-38, SC-39 or SC-40 (trade name) manufactured by Fuji Photo Film Co., Ltd. and Acryplen (trade name) manufactured by Mitsubishi Rayon Co., Ltd.

<Surface Protective Layer>

The surface protective layer 5 is a layer having a function of protecting the surface of the composite filter. The surface protective layer can be formed as a transparent resin layer, and from the viewpoint of resistance to scratch and surface contamination, the resin layer is formed preferably as a resin-cured layer prepared by curing a curable resin. Such resin-cured layer can also be formed as a hard coat layer (also abbreviated to HC layer). The surface protective layer may also be formed not only as a single layer but also as multiple layers.

When the surface protective layer also applicable as a hard coat layer is formed, the curable resin used therein may be suitably selected from ionizing radiation-curable resins and other known curable resins etc., depending on required performance etc. The ionizing radiation-curable resins include resins based on acrylate, oxetane and silicone. The acrylate-based ionizing radiation-curable resins include, for example, (meth)acrylic ester monomers such as a monofunctional (meth)acrylate monomer, a bifunctional (meth)acrylate monomer, a trifunctional or more (meth)acrylate monomer, (meth)acrylate oligomers or (meth)acrylate prepolymers such as urethane (meth)acrylate, epoxy (meth)acrylate and polyester (meth)acrylate. The trifunctional or more (meth) acrylate monomer can be exemplified by trimethylolpropane tri(meth)acrylate, pentaerythritol tetra(meth)acrylate, dipentaerythritol (meth)acrylate and the like.

A resin composition consisting of the curable resin such as the ionizing radiation-curable resin is applied onto the surface of the transparent substrate film, and the resin is cured to form a surface protective layer. An ionizing radiation for curing the ionizing radiation-curable resin is typically a UV ray, an electron beam or the like. For applying the resin composition consisting of a curable resin onto the surface of the transparent substrate film, a known coating method or printing method (which may be transferring printing) can be suitably used.

The thickness of the surface protective layer may be such thickness as to enable protection of the composite filter.

For improving contamination resistance, a silicone compound, a fluorine compound and the like may be added to the surface protective layer.

The surface protective layer may be a layer serving mainly as an antifouling layer that prevents attachment of dust and contaminants caused by environmental pollution or by careless contact with the surface of the composite filter at use, or a layer formed for easily removing dust and contaminants attaching thereto. The surface protective layer makes use of, for example, a fluorine-based coating resin, a silicon-based coating agent, and a silicon/fluorine-based coating agent, among which the silicon/fluorine-based coating agent can be preferably used. The thickness of the surface protective layer as an antifouling layer is preferably 100 nm or less, more preferably 10 nm or less, even more preferably 5 nm or less. When the thickness of the antifouling layer is more than 100 nm, the layer is excellent in initial contamination resistance, but is inferior in durability. For the balance between contamination resistance and durability, the thickness is most preferably 5 nm or less.

The surface protective layer may have a function of preventing mirror reflection of external light in addition to the surface protection function.

Specifically in this embodiment, the surface protective layer also serves as an antiglare layer or an antireflective layer. In this embodiment where the surface protective layer also serves as an antiglare layer for example, light diffusing particles are added to the surface protective layer or to the uppermost layer when the surface protective layer consists of multiple layers, or the surface of the surface protective layer is roughened by shaping. The light diffusing particles include inorganic particles and organic particles, and the inorganic particles include, for example, silica, and the organic particles include, for example, resin particles.

When the surface of the transparent substrate film is roughened by shaping, the resin composition for forming a surface protective layer is applied onto the surface of the transparent substrate film, during which or after which the surface may be roughened with a shaping sheet or a shaping plate while the resin is still fluidic prior to complete curing.

When the surface protective layer is allowed to serve also as an antireflective layer, the surface protective layer (or the uppermost layer when the surface protective layer consists of multiple layers) may be formed as a layer having a lower refractive index than that of a layer located immediately below it by the method described above in the antireflective layer.

<Adhesive Layer, Transparent Substrate>

In the composite filter of the present invention, the adhesive layer of the present invention is used as an adhesive layer to which a light absorbing agent is added. However, when a light absorbing agent-free adhesive layer is also used, the composite filter may have such an adhesive layer consisting of other constituents, in addition to the adhesive layer of the present invention. As the adhesive used in the adhesive layer, an adhesive that has adhesiveness (adhesive force), transparency, coatability etc., which is preferably color less by itself, is suitably selected from adhesives known in the art. Such an adhesive can be selected from, for example, an acrylic adhesive, a rubber-based adhesive and a polyester-based adhesive, among which the acrylic adhesive is preferable from the viewpoint of adhesiveness and transparency. In addition, a commercial double-sided adhesive tape, for example under the trade name of CS-9611 manufactured by Nitto Denko Corporation, can also be used.

If necessary, the transparent substrate used as a support for the respective functional layers can be the same transparent substrate as described above in the electromagnetic wave shielding layer.

The respective layers have been illustrated, and when the composite filter of the present invention is applied to typical use, that is, to the front face of a plasma display panel, the light transmittance of the composite filter in the region of near-infrared light (800 to 1100 nm) emitted from the plasma display panel using xenon-gas discharge is preferably 30% or less, more preferably 20% or less, even more preferably 10% or less.

When the composite filter of the present invention is applied to typical use, that is, to the front face of a plasma display panel, the light transmittance of the composite filter in the region of neon light (570 to 610 nm) emitted by neon atoms which after excitation, return to the ground state in the plasma display panel using xenon-gas discharge is preferably 50% or less, more preferably 40% or less.

The composite filter of the present invention preferably has sufficient light transmittance (that is, luminous transmittance) of 20% or more, particularly 30% or more, in the visible light region that is a wavelength range of 380 to 780 nm.

The light transmittance in the present invention can be measured with a spectrophotometer (for example, UV-3100PC manufactured by Shimadzu Corporation) according to JIS-Z8701.

The composite filter of the present invention has optical filter functions excellent in durability and thus hardly undergoes the change in spectral properties attributable to deterioration in the light absorbing agent even when used for a long time at high temperature under high humidity. Specifically, both differences $\Delta x$ and $\Delta y$ in chromaticity (x, y) of the test sample before and after left for 1000 hours in a high-temperature atmosphere (for example, ambient temperature 80° C., relative humidity 10% or less) or in a high-temperature high-humidity atmosphere (for example, ambient temperature 60° C., relative humidity 90%) are preferably 0.03 or less, more preferably 0.02 or less.

(Method for Manufacturing the Composite Filter)

The method for manufacturing the composite filter is not particularly limited, but it is preferable that a continuous belt-shaped transparent substrate film is prepared, and while this continuous belt-shaped film is delivered continuously or intermittently, the necessary layers are formed thereon continuously or intermittently. That is, the composite filter is formed preferably by roll-to-roll processing, from the viewpoint of productivity and the like. In this case, the processing is continued preferably with one machine until the final layer is laminated.

The order of forming the respective layers is not particularly limited, and the layers may be formed in a suitable order depending on specifications. Formation of the layers will be described for example by reference to the constitution of the simple filter.

First, a transparent substrate film is prepared, and this transparent substrate film is subjected to any one of the following procedures (A) to (C):

(A): 1. Formation of the surface protective layer, 2. formation of the electroconductive layer and subsequent formation of the electroconductive mesh layer, and 3. formation of the adhesive layer;

(B): 1. Formation of the electroconductive layer and subsequent formation of the electroconductive mesh layer, 2. formation of the surface protective layer, and 3. formation of the adhesive layer; and (C): 1. Formation of the electroconductive layer, 2. formation of the surface protective layer, 3. formation of the electroconductive mesh layer from the electroconductive layer, and 4. formation of the adhesive layer.

When the adhesive layer is formed partially for example for the purpose of exposing an earthing area of the electroconductive mesh layer in production of the composite filter by roll-to-roll processing, partial formation of the adhesive layer is carried out as follows: in the form (form A) wherein the continuous belt-shaped laminate (laminate film having the electroconductive mesh layer laminated on the transparent substrate film) is exposed at one end or both ends thereof in the width direction (in a direction perpendicular to the delivery direction) while the adhesive layer is partially formed as a continuous layer in the longer direction of the laminate (in the delivery direction), the adhesive layer is formed by applying its coating solution in narrower width continuously in the longer direction.

When the adhesive layer is partially formed in the form where the continuous belt-shaped laminate is partially exposed across the full width thereof (form B, that is, the form which is different from the form A by 90° in the lengthwise and crosswise relationship), the adhesive layer is partially formed by applying its coating solution intermittently such that the adhesive layer is not formed in the longer direction so as to expose the corresponding part in the width direction. That is, the coating solution is applied not on the whole area but in a patterned form. Intermittent coating may be carried out not only by a coating method but also by a printing method including transfer, and a suitable method can be selected from methods known in the art.

In the most common form (that is, the form (C)), wherein the electroconductive mesh layer has a mesh area in the center and an earthing area in the form of a frame around the mesh area, and this earthing area is exposed in the form of a frame, the width is made narrow such as in the form A, while intermittent coating is carried out.

When the adhesive layer is partially formed, the adhesive layer is also formed on a part of the earthing area, usually on a part of the earthing area in the vicinity of the periphery of the mesh area. This is because the mechanically weak mesh area can be protected certainly even when the adhesive layer is formed slightly out of alignment.

The longitudinally continuous belt-shaped composite filter produced in this manner is cut into sheets each serving as a composite filter on a display to which it is applied.

The present invention is not limited to the embodiments illustrated above. These embodiments are provided for illustrative purposes only, and those having substantially the same constitution as in the technical idea described in the claims of the present invention and exhibiting the same working effect as in the present invention fall under the technical scope of the present invention.

EXAMPLES

Hereinafter, the present invention is described in detail by reference to the Examples.

Example 1

As solvents, 25 parts by mass of toluene and 25 parts by mass of methyl ethyl ketone were mixed with 50 parts by mass of a triblock copolymer (LA2140e manufactured by Kuraray Co., Ltd.) with a (polymethyl methacrylate)-(poly-n-butyl acrylate)-(polymethyl methacrylate) structure having a weight average molecular weight of 80,000 and a molecular weight distribution (Mw/Mn) of 1.17, to prepare a resin solution. As near-infrared light absorbing agents, 0.2 part by mass of Excolor IR12 (phthalocyanine-based compound) and 0.1 part by mass of IR14 (phthalocyanine-based compound) (both of which are trade names, manufactured by Nippon Shokubai Co., Ltd.) and 0.4 part by mass of Kayasorb IRG-068 (diimmonium-based compound) (trade name, manufactured by Nippon Kayaku Co., Ltd.) were added to, and sufficiently dispersed in, the resin solution, whereby an adhesive composition for optical filter was prepared.

The adhesive composition was applied with an applicator onto a release-treated PET of 100 μm in thickness (E7002 manufactured by Toyobo Co., Ltd.) such that the thickness of the coating after drying became 25 μm, and then the coating was dried at 80° C. for 3 minutes, and then a release-treated PET of 100 μm in thickness was laminated thereon, whereby an adhesive layer having optical filter functions was obtained.

The adhesive layer in Example 1 was evaluated for its durability and glass adhesion by evaluation methods described later.

As a result, both differences $\Delta x$ and $\Delta y$ in chromaticity (x, y) of the test sample before and after left for 1000 hours both in a high-temperature atmosphere (ambient temperature 80° C., relative humidity 10% or less) and in a high-temperature high-humidity atmosphere (ambient temperature 60° C., relative humidity 90%) were respectively 0.02 or less.

All of the glass adhesion of the adhesive layer before and after left for 1000 hours both in a high-temperature atmosphere (ambient temperature 80° C., relative humidity 10% or less) and in a high-temperature high-humidity atmosphere (ambient temperature 60° C., relative humidity 90%) showed a value in the range of 10 to 15 N/25 mm, while the adhesive did not remain on the surface of the adherend.

<Evaluation>

The resulting adhesive layer was attached to a glass plate 32 (a high strain point glass plate (tradename: PD-200, thickness 2.8 mm) manufactured by Asahi Glass Co., Ltd. was used as a front glass plate for a display device), and then a PET film (A4100, thickness 50 μm, manufactured by Toyobo Co., Ltd.) was laminated thereonto, thus preparing a test sample.

(1) Durability

First, the chromaticity (x, y) of the test sample before the durability test was measured.

(High-Temperature Durability Test)

The resulting test sample was left for 1000 hours in a high-temperature atmosphere (ambient temperature 80° C., relative humidity 10% or less) and then measured for its chromaticity (x, y) in the same manner as described above. The chromaticity was measured with a spectrophotometer (for example, UV-3100PC manufactured by Shimadzu Corporation).

From the measured values of the chromaticity (x, y) of the test sample before and after left in the high-temperature atmosphere, differences $\Delta x$ and $\Delta y$ in chromaticity (x, y) were determined.

(High-Temperature High-Humidity Durability Test)

The resulting test sample was left for 1000 hours in a high-temperature high-humidity atmosphere (ambient temperature 60° C., relative humidity 90%) and then measured for its chromaticity (x, y) in the same manner as described above.

From the measured values of the chromaticity (x, y) of the test sample before and after left in the high-temperature high-humidity atmosphere, differences $\Delta x$ and $\Delta y$ in chromaticity (x, y) were determined.

(2) Glass Adhesion

The glass adhesion can be measured by peeling the PET film and the adhesive layer attached to the glass plate, at a rate of 200 mm/min. at an angle of 90° between the glass plate and the PET film in accordance with a test in JIS Z0237-2000.

Comparative Example 1

A triblock copolymer consisting of a polymethyl methacrylate block (14 parts by mass)-poly-n-butyl acrylate block (72 parts by weight)-polymethyl methacrylate block (14 parts by weight) was obtained by polymerizing n-butyl acrylate with methyl methacrylate by an iniferter polymerization method using p-xylene-bis(N,N-diethyldithiocarbamate) as a polymerization initiator. The weight average molecular weight of the resulting triblock copolymer was 316,400, and the molecular weight distribution (Mw/Mn) thereof was 2.26.

The adhesive layer having optical filter functions in Comparative Example 1 was obtained in the same manner as in Example 1 except that 50 parts by mass of the triblock copolymer having a weight average molecular weight of 316,400 and a molecular weight distribution (Mw/Mn) of 2.26 obtained above were used in place of 50 parts by mass of the triblock copolymer (LA2140e manufactured by Kuraray Co., Ltd.) in Example 1.

The adhesive layer in Comparative Example 1 was evaluated for its durability and glass adhesion by the same evaluation method as in Example 1.

As a result, the colors of light transmitted through the adhesive layer after left for 1000 hours both in a high-temperature atmosphere (ambient temperature 80° C., relative humidity 10% or less) and in a high-temperature high-humidity atmosphere (ambient temperature 60° C., relative humidity 90%) were changed, and differences $\Delta x$ and $\Delta y$ in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (ambient temperature 60° C., relative humidity 90%) were less than 5 N/25 mm.

Comparative Example 2

The adhesive layer having optical filter functions in Comparative Example 2 was obtained in the same manner as in Example 1 except that 50 parts by mass of an acrylic adhesive (that is, a triblock copolymer having the same linkage structure B1-A1-B1 as in Example 1, which was polymerized so as to have a weight average molecular weight of 47,000 and a molecular weight distribution (Mw/Mn) of 1.65) were used in place of 50 parts by mass of the triblock copolymer (LA2140e manufactured by Kuraray Co., Ltd.) in Example 1.

The adhesive layer in Comparative Example 2 was evaluated for its durability and glass adhesion by the same evaluation method as in Example 1.

As a result, the colors of light transmitted through the adhesive layer after left for 1000 hours both in a high-temperature atmosphere (ambient temperature 80° C., relative humidity 10% or less) and in a high-temperature high-humidity atmosphere (ambient temperature 60° C., relative humidity 90%) were changed, and differences Δx and Δy in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (ambient temperature 60° C., relative humidity 90%) were not less than 30 N/25 mm, and the adhesive remained on the surface of the adherend.

Example 2

As solvents, 25 parts by mass of toluene and 25 parts by mass of methyl ethyl ketone were mixed with 50 parts by mass of a triblock copolymer (LA2140e manufactured by Kuraray Co., Ltd.) with a (polymethyl methacrylate)-(poly-n-butyl acrylate)-(polymethyl methacrylate) structure having a weight average molecular weight of 80,000 and a molecular weight distribution (Mw/Mn) of 1.17 to prepare a resin solution. 0.1 part by mass of Excolor IR-10A (phthalocyanine-based compound), 0.05 part by mass of Excolor 906B (phthalocyanine-based compound) and 0.1 part by mass of Excolor 910B (phthalocyanine-based compound) (all of which are trade names of near-infrared light absorbing agents manufactured by Nippon Shokubai Co., Ltd.), 0.0225 part by mass of a neon light absorbing agent (tetraazaporphyrin-based compound) (TAP-2 manufacture by Yamada Chemical Co., Ltd.) and 0.0125 part by mass of a toning dye (anthraquinone-based compound) (Plast Red 8320 manufactured by Arimoto Chemical Co., Ltd.) were added to, and sufficiently dispersed in, the resin solution, whereby an adhesive composition for optical filter was prepared.

The adhesive composition was applied with an applicator onto a release-treated PET of 100 μm in thickness (E7002 manufactured by Toyobo Co., Ltd.) such that the thickness of the coating after drying became 500 μm, and then the coating was dried at 100° C. for 5 minutes, and then a release-treated PET of 100 μm in thickness was laminated thereon, whereby an adhesive layer having optical filter functions was obtained.

Durability and glass adhesion were evaluated in the same manner as in Example 1, and impact resistance was also evaluated by a method described later.

As a result, both differences Δx and Δy in chromaticity (x, y) of the test sample before and after left for 1000 hours both in a high-temperature atmosphere (ambient temperature 80° C., relative humidity 10% or less) and in a high-temperature high-humidity atmosphere (ambient temperature 60° C., relative humidity 90%) were respectively 0.02 or less.

All of the glass adhesion of the adhesive layer before and after left for 1000 hours both in a high-temperature atmosphere (ambient temperature 80° C., relative humidity 10% or less) and in a high-temperature high-humidity atmosphere (ambient temperature 60° C., relative humidity 90%) showed a value in the range of 10 to 15 N/25 mm, while the adhesive did not remain on the surface of the adherend.

As a result of the following impact resistance test, the breaking energy was 0.6 J.

<Evaluation of Impact Resistance>

Figure 4:
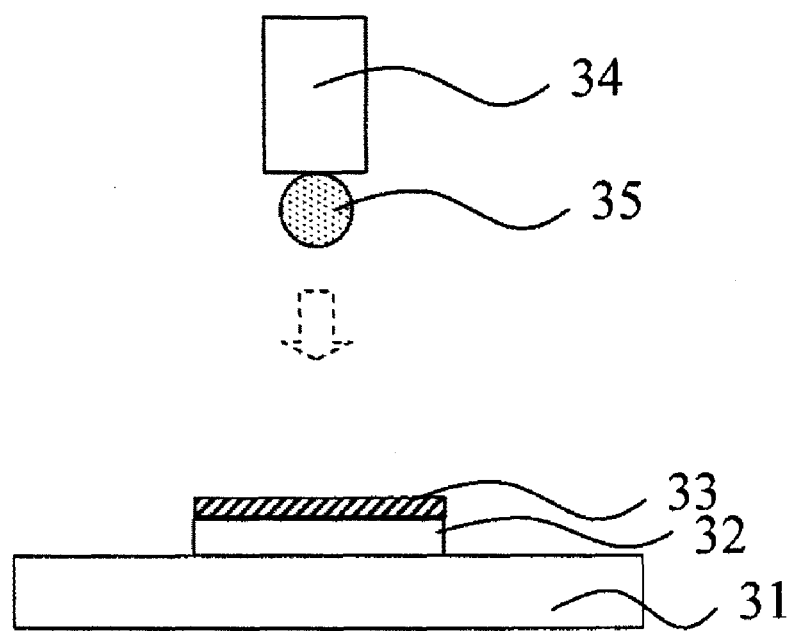
FIG. 4 is a view showing an impact test apparatus used in the impact resistance test of the present invention.

The impact resistance test was carried out using an impact test apparatus shown in FIG. 4. A steel ball 35 (mass 534 g) (Steel Ball for Ball Bearing prescribed in JIS B1501) was raised from a height of 7.7 cm so as to increase breaking energy stepwise by 0.1 J and then dropped onto the test sample. After this impact resistance test, whether a glass plate of 2.8 mm in thickness had been broken or not was confirmed with the naked eye, and the maximum breaking energy at which the glass plate was not broken and was free of abnormality was determined. As a test stand 31, an SUS steel plate was used. The test sample was mounted on the test stand 31. The breaking energy where the steel ball was dropped from a height of 9.6 cm for example is about 0.5 J which is determined from the following equation: the steel-ball weight (kg)×height (m)×9.8 (m/s$^2$)=0.534×0.096×9.81.

Comparative Example 3

The adhesive layer having optical filter functions (dried coating of 500 μm in thickness) in Comparative Example 3 was obtained in the same manner as in Example 1 except that 50 parts by mass of a diblock copolymer (LA1114 manufactured by Kuraray Co., Ltd.) was used in place of 50 parts by mass of the triblock copolymer (LA2140e manufactured by Kuraray Co., Ltd.) in Example 1.

The adhesive layer in Comparative Example 3 was evaluated for its durability, glass adhesion and impact resistance by the same evaluation methods as in Example 2.

As a result, the colors of light transmitted through the adhesive layer after left for 1000 hours both in a high-temperature atmosphere (ambient temperature 80° C., relative humidity 10% or less) and in a high-temperature high-humidity atmosphere (ambient temperature 60° C., relative humidity 90%) were changed, and differences Δx and Δy in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (ambient temperature 60° C., relative humidity 90%) were not less than 30 N/25 mm, and the adhesive remained on the surface of the adherend.

As a result of the impact resistance test, the breaking energy was 0.5 J which was lower by 0.1 J than in Example 2, even though the adhesive layer had the same thickness in both the examples.

Example 3

(Weight average molecular weight (Mw)≧50,000 and a molecular weight distribution (Mw/Mn)<1.5) (surface protective layer was a hard coat)

(1) Preparation of a Continuous Belt-Shaped Laminate

First, a continuous belt-shaped laminate (laminate film having an electro conductive mesh layer laminated on a transparent substrate film) was prepared in the following manner.

A continuous belt-shaped, color less and transparent biaxially stretched polyethylene terephthalate film of 100 μm in thickness (trade name: HBPF8W, manufactured by Teijin DuPont Film) was prepared as a transparent substrate film 11. This transparent substrate film contains a UV absorbing agent and also has a UV absorption function.

On one side of this transparent substrate film, a polyester resin-based primer layer was formed, and then a nickel-chromium alloy layer of 0.1 μm in thickness and a copper layer of 0.2 μm (a part of an electroconductive layer) were disposed in this order by sputtering, to form an electroconductively treated layer. On the electroconductively treated layer, a metal plated layer of copper having a thickness of 2.0 μm was disposed by electrolytic plating using a copper sulfate bath.

Then, a blackened layer was formed on the electroconductive layer (metal plated layer). Specifically, the laminate film having the electroconductive layer formed on the transparent substrate film was subjected to blackening treatment with electrolytic plating by dipping the laminate film in a blackening treatment plating bath consisting of an aqueous mixture of aqueous ammonium nickel sulfate, aqueous zinc sulfate and aqueous sodium thiocyanate with a nickel plate as an anode, thereby coating the whole surface of the exposed metal plated layer with a blackened layer consisting of a nickel-zinc alloy, whereby a continuous belt-shaped laminate having the electroconductive layer (the electroconductively treated layer, the metal plated layer and the blackened layer) laminated on one side of the transparent substrate film was obtained.

Then, the electroconductive layer of the continuous belt-shaped laminate was etched by photolithography, whereby a mesh area consisting of openings and lines, and an earthing area in the form of a frame around the mesh area, were formed on each unit of an intended display.

In the etching, the continuous belt-shaped laminate was subjected to a series of steps of from masking to etching by using a production line for color-TV shadow mask. That is, the whole surface of the electroconductive layer of the laminate was coated with a photosensitive etching resist, then exposed with a light via a mask having a negative pattern of a desired mesh pattern, developed, subjected to film hardening treatment followed by baking, to form a resist layer in such a pattern that the resist layer remained on parts corresponding to lines of the mesh but not remained on parts corresponding to openings, and then the electroconductive layer (the electroconductively treated layer, the metal plated layer) and the blackened layer were removed by etching with an aqueous solution of ferric chloride to form mesh openings, then washed with water to remove the resist, cleaned, and dried.

In the above pattern, the mesh in the mesh area was formed such that its opening was square-shaped, the line width of a line part serving as a non-opening part was 10 μm, the line pitch was 300 μm, and the height of the line part was 2.3 μm, and when the continuous belt-shaped composite filter was cut into rectangular sheets, the bias angle defined as inferior angle to the longer side of the rectangle was 49°. When the continuous belt-shaped composite filter was cut into rectangular sheets each serving as a composite filter for 1 unit of an applied display, the mesh area was designed in such a pattern that upon attachment of the composite filter to the front face of PDP, the mesh area existed in the part corresponding to the image display region of the PDP, and an opening-free frame part of 15 mm in width serving as an earthing area was left on the four sides around the mesh area.

In this manner, the continuous belt-shaped laminate (laminated film having the electroconductive mesh layer laminated on the transparent substrate film) was obtained.

(2) Formation of a Surface Protective Layer

A surface protective layer was formed on the whole surface in the obverse side of the continuous belt-shaped laminate (that is, the surface of the transparent substrate film of the laminate) Specifically, 100 parts by mass of a UV-curable resin dipentaerythritol hexaacrylate (manufactured by Nippon Kayaku Co., Ltd.) as an ionizing radiation-curable resin, 4.0 parts by mass of a light-curing initiator IRGACURE 184 (manufactured by Ciba Geigy) and 52 parts by mass of a solvent methyl isobutyl ketone were sufficiently mixed to prepare a surface protective layer-forming coating solution. Then, the coating solution was applied intermittently with a die coater on the surface of the transparent substrate film of the continuous belt-shaped laminate, so as to form a coating of 7 μm in thickness thereon, and then dried by heating in an oven at 50° C. and cured (accumulated light quantity: 200 mJ) with an H bulb as a light source of a UV radiation device (Fusion UV System Japan) in a $N_2$ atmosphere, to form a single surface protective layer serving as a hard coat layer.

(3) Formation of an Adhesive Layer

Then, an adhesive layer to which various dyes had been added was formed on the backside (the side of the electroconductive mesh layer) of the continuous belt-shaped laminate having the surface protective layer formed thereon. As phthalocyanine-based NIR absorption dyes, 0.04 part by mass of Excolor IR-10A™, 0.02 part by mass of Excolor 906B™, and 0.04 part by mass of Excolor 910B™ (all of which are manufactured by Nippon Shokubai Co., Ltd.), 0.009 part by mass of a tetraazaporphyrin-based Ne light absorption dye (trade name: TAP-2, manufactured by Yamada Chemical Co., Ltd.), and 0.005 part by mass of a color correction dye (trade name: Plast Red 8320 manufactured by Arimoto Chemical Co., Ltd.) were added to, and sufficiently dispersed in, 20 parts by mass of an acrylic adhesive solution in which an acrylic adhesive (tradename: LA2140e, manufactured by Kuraray Co., Ltd., a weight average molecular weight (Mw) of 80,000, a molecular weight distribution (Mw/Mn) of 1.17, comprising a triblock copolymer in the form of B1-A1-B1 wherein the copolymer block B1 consists of polymethyl methacrylate having a glass transition temperature (Tg) of 110° C., and the polymer block A1 consists of poly-n-butyl acrylate having a glass transition temperature (Tg) of −45° C.) had been dissolved in a solid content of 20% (based on mass) in a mixed solvent (methyl ethyl ketone/toluene=1/1 by weight), thereby preparing an adhesive composition for optical filter.

Then, the adhesive composition for optical filter was applied to a thickness of 25 μm with a dye coater onto the surface of the electroconductive mesh layer, that is, onto the backside of the laminate, then dried at 100° C. for 1 minute with a dry air at an air rate of 5 m/sec. in an oven to form an adhesive layer, to give a continuous belt-shaped composite filter. Further, the adhesive layer was protected by attaching a releasable release film to the surface of the adhesive layer.

By an intermittent coating method, the adhesive layer was partially formed so as not to cover the earthing area of the electroconductive mesh layer but to cover the mesh area.

Each of the resulting composite filters was left for 1000 hours in an atmosphere at an ambient temperature of 80° C. under 10% or less relative humidity or in an atmosphere at an ambient temperature of 60° C. under 95% relative humidity, and then measured for chromaticity (x, y). As a result, the differences ($\Delta x$ and $\Delta y$) from the initial values were $\Delta x<0.02$ and $\Delta y<0.02$ under both the condition at an ambient temperature of 80° C. under 10% or less relative humidity and the condition at an ambient temperature of 60° C. under 95% relative humidity.

Example 4

(Weight average molecular weight (Mw)≧50,000 and a molecular weight distribution (Mw/Mn)<1.5) (surface protective layer has an antiglare function)

A continuous belt-shaped composite filter was obtained in the same manner as in Example 3 except that (2) Formation of a surface protective layer in Example 3 was carried out as follows:

(2) Formation of a Surface Protective Layer

A surface protective layer was formed on the whole surface of the obverse side of the continuous belt-shaped laminate, that is, on the surface of the transparent substrate film of the laminate. Specifically, 70 parts by mass of a UV-curable resin pentaerythritol triacrylate (refractive index 1.49, manufactured by Nippon Kayaku Co., Ltd.) as an ionizing radiation-curable resin, 30 parts by mass of a UV-curable resin isocyanurate EO-modified diacrylate (refractive index 1.51, manufactured by Toagosei Co., Ltd.), 10.0 parts by mass of an acrylic polymer (molecular weight 75,000, manufactured by Mitsubishi Rayon Co., Ltd.), 5.0 parts by mass of a light-curing initiator IRGACURE 184 (manufactured by Ciba Geigy), 15.0 parts by mass of styrene beads as translucent fine particles (particle diameter 3.5 μm, refractive index 1.60, manufactured by Soken Chemical & Engineering Co., Ltd.), 0.01 part by mass of a leveling agent (trade name: 10-28, manufactured by The Inctec Inc.), 127.5 parts by mass of toluene, and 54.6 parts by mass of cyclohexane were sufficiently mixed to prepare a coating solution. This coating solution was filtered through a propylene filter having a pore size of 30 μm to prepare a surface protective layer-forming coating solution. Then, the coating solution was applied intermittently with a die coater on the surface of the transparent substrate film of the continuous belt-shaped laminate, so as to form a coating of 7 μm in thickness, then dried by heating in an oven at 50° C. and cured (accumulated light quantity: 200 mJ) with an H bulb as a light source of a UV radiation device (Fusion UV System Japan) in a $N_2$ atmosphere, to form a single surface protective layer serving as a hard coat layer.

Each of the resulting composite filters was left for 1000 hours in an atmosphere at an ambient temperature of 80° C. under 10% or less relative humidity or in an atmosphere at an ambient temperature of 60° C. under 95% relative humidity and then measured for chromaticity (x, y). As a result, the differences (Δx and Δy) from the initial values were Δx<0.02 and Δy<0.02 under both the condition at an ambient temperature of 80° C. under 10% or less relative humidity and the condition at an ambient temperature of 60° C. under 95% relative humidity.

Comparative Example 4

Form Wherein an Additional Laminate of a Filter Film is Required (1) Formation of an Adhesive Filter Film A continuous belt-shaped, color less and transparent biaxially stretched polyethylene terephthalate film of 100 μm in thickness (trade name: HBPF8W, manufactured by Teijin DuPont Film) was prepared as a transparent substrate film 11. This transparent substrate film contains a UV absorbing agent and also has a UV absorption function.

Then, a high refractive index layer and a low refractive index layer were formed successively on one side (which would be an obverse side) of this transparent substrate film, to prepare an antireflective layer consisting of these layers. The high refractive index layer consists of a cured layer of 3 μm in thickness having a refractive index of 1.69 using a composition having superfine zirconia particles dispersed in a UV-curing resin (trade name: KZ7973, manufactured by JSR). On the other hand, the low refractive index resin layer consists of a cured layer of 100 nm in thickness having a refractive index of 1.41 using a fluorine resin-based UV-curing resin (trade name: TM086, manufactured by JSR).

Then, a filter film having a layer of 5 μm in thickness serving as both a NIR absorption layer and Ne light absorption layer, laminated on the other side (which would be a backside) of the transparent substrate film having the antireflective layer formed thereon, was prepared. A diimmonium-based dye and a phthalocyanine-based dye were used as the near-infrared light absorbing agent, and a cyanine-based dye was used as the neon light absorbing agent, and these dyes were mixed with an acrylic resin binder (BR-52 manufactured by Mitsubishi Rayon Co., Ltd., which is different from the specific block copolymer used in the present invention) to give a coating solution which was then applied via a gravure roll onto the transparent substrate film to form a layer serving as both NIR absorption layer and Ne light absorption layer.

Further, a color correction adhesive layer endowed with a color correction function was laminated on the layer serving as NIR absorption layer and Ne light absorption layer, to prepare a continuous belt-shaped adhesive filter film.

A coating solution using an acrylic resin adhesive to which a color correction dye had been added was applied with a gravure roll to form the adhesive layer of 25 μm in thickness.

(2) Formation of a Continuous Belt-Shaped Laminate

A description is omitted because a continuous belt-shaped laminate (laminate film having an electroconductive mesh layer laminated on a transparent substrate film) prepared in the same manner as in (1) Preparation of a continuous belt-shaped laminate in Example 3 was used.

(3) Lamination of the Adhesive Filter Film on the Continuous Belt-Shaped Laminate Using a laminator, the adhesive filter film was laminated by its adhesive layer surface on the surface of the electroconductive mesh layer of the continuous belt-shaped laminate, to prepare a laminate film.

(4) Formation of an Adhesive Layer

A composite filter as a comparative example was prepared by forming a usual adhesive layer on the surface of the transparent substrate film of the laminate film in the same manner as in Example 3 except that no dye was added in (3) Formation of an adhesive layer in Example 3, and the surface on which the adhesive layer was formed was the surface of the transparent substrate film.

The resulting composite filter had a 7-layer structure with a total thickness of 260 μm, while each of the composite filters prepared in Examples 3 and 4 had a 4-layer structure with a total thickness of 134 μm, and it was confirmed that in the composite filter of the invention, there was an effect on reduction in the number of constituent layers and in the total thickness.

Comparative Example 5

(Weight average molecular weight (Mw)<50,000 and a molecular weight distribution (Mw/Mn)≧1.5)

A continuous belt-shaped composite filter was obtained in the same manner as in Example 3 except that (3) Formation of an adhesive layer in Example 3 was carried out as follows:

(3) Formation of an Adhesive Layer

Then, an adhesive layer was formed partially by intermittent coating on the backside (the electroconductive mesh layer) of the continuous belt-shaped laminate so as not to cover the earthing area but to cover the mesh area. As phthalocyanine-based NIR absorption dyes, 0.04 part by mass of Excolor IR-10A™, 0.02 part by mass of Excolor 906B™, and 0.04 part by mass of Excolor 910B™ (all of which are manufactured by Nippon Shokubai Co., Ltd.), 0.009 part by mass of a tetraazaporphyrin-based Ne light absorption dye (trade name: TAP-2, manufactured by Yamada Chemical Co., Ltd.), and 0.005 part by mass of a toning dye (trade name: Plast Red 8320, manufactured by Arimoto Chemical Co., Ltd.) were added to, and sufficiently dispersed in, 20 parts by mass of an acrylic adhesive solution in which an adhesive for forming the adhesive layer, that is, an acrylic adhesive (a triblock copolymer having the same B1-A1-B1 linkage structure as in Example 3 and polymerized so as to have a weight average molecular weight (Mw) of 47,000 and a molecular weight distribution (Mw/Mn) of 1.65) had been dissolved in a solid content of 20% (based on weight) in a mixed solvent (methyl ethyl ketone/toluene (solvent mixing ratio=1:1 on a weight base), thereby preparing a coating solution.

Then, the coating solution was applied in a coating amount of 20 g/m² with a die coater onto the surface of the transparent substrate film, that is, onto the backside of the laminate, then dried at 100° C. for 1 minute with a dry air at an air rate of 5 m/sec. in an oven to form an adhesive layer, to give a continuous belt-shaped composite filter. The adhesive layer was protected by attaching a releasable release film to the surface of the adhesive layer.

The resulting composite filter was left for 500 hours in an atmosphere at an ambient temperature of 60° C. under 95% relative humidity, and as a result, the transmission color of the filter was changed (Δx>0.03, Δy>0.03).

Example 5

The adhesive layer having optical filter functions in Example 5 was obtained in the same manner as in Example 1 except that 50 parts by mass of an acrylic adhesive (a triblock copolymer having the same B1-A1-B1 linkage structure as in Example 1 and polymerized so as to have a weight average molecular weight (Mw) of 60,000 and a molecular weight distribution (Mw/Mn) of 1.40) were used in place of 50 parts by mass of the triblock copolymer (LA2140e manufactured by Kuraray Co., Ltd.) in Example 1.

The adhesive layer in Example 5 was evaluated for its durability and glass adhesion by the same evaluation methods as in Example 1.

As a result, both differences Δx and Δy in chromaticity (x, y) of the adhesive layer in Example 5 after left for 1000 hours both in a high-temperature atmosphere (ambient temperature 80° C., relative humidity 10% or less) and in a high-temperature high-humidity atmosphere (for example, ambient temperature 60° C., relative humidity 90%) were respectively 0.03 or less.

All of the glass adhesion of the adhesive layer before and after left for 1000 hours in a high-temperature atmosphere (ambient temperature 80° C., relative humidity 10% or less) and in a high-temperature high-humidity atmosphere (for example, ambient temperature 60° C., relative humidity 90%) showed 10 to 15 N/25 mm, while the adhesive did not remain on the surface of the adherend.

Example 6

The adhesive layer having optical filter functions in Example 6 was obtained in the same manner as in Example 1 except that 50 parts by mass of an acrylic adhesive (a triblock copolymer having the same B1-A1-B1 linkage structure as in Example 1 and polymerized so as to have a weight average molecular weight (Mw) of 110,000 and a molecular weight distribution (Mw/Mn) of 1.40) were used in place of 50 parts by mass of the triblock copolymer (LA2140e manufactured by Kuraray Co., Ltd.) in Example 1.

The adhesive layer in Example 6 was evaluated for its durability and glass adhesion by the same evaluation methods as in Example 1.

As a result, both differences Δx and Δy in chromaticity (x, y) of the adhesive layer in Example 6 after left for 1000 hours both in a high-temperature atmosphere (ambient temperature 80° C., relative humidity 10% or less) and in a high-temperature high-humidity atmosphere (for example, ambient temperature 60° C., relative humidity 90%) were respectively 0.03 or less.

All of the glass adhesion of the adhesive layer before and after left for 1000 hours in a high-temperature atmosphere (ambient temperature 80° C., relative humidity 10% or less) and in a high-temperature high-humidity atmosphere (for example, ambient temperature 60° C., relative humidity 90%) showed 10 to 15 N/25 mm, while the adhesive did not remain on the surface of the adherend.

Comparative Example 6

The adhesive layer having optical filter functions in Comparative Example 6 was obtained in the same manner as in Example 1 except that 50 parts by mass of an acrylic adhesive (a triblock copolymer having the same B1-A1-B1 linkage structure as in Example 1 and polymerized so as to have a weight average molecular weight (Mw) of 60,000 and a molecular weight distribution (Mw/Mn) of 1.65) were used in place of 50 parts by mass of the triblock copolymer (LA2140e manufactured by Kuraray Co., Ltd.) in Example 1.

The adhesive layer in Comparative Example 6 was evaluated for its durability and glass adhesion by the same evaluation methods as in Example 1.

As a result, the colors of light transmitted through the adhesive layer after left for 1000 hours both in a high-temperature atmosphere (ambient temperature 80° C., relative humidity 10% or less) and in a high-temperature high-humidity atmosphere (for example, ambient temperature 60° C., relative humidity 90%) were changed, and differences Δx and Δy in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (for example, ambient temperature 60° C., relative humidity 90%) showed not less than 30 N/25 mm, and the adhesive remained on the surface of the adherend.

Comparative Example 7

The adhesive layer having optical filter functions in Comparative Example 7 was obtained in the same manner as in Example 1 except that 50 parts by mass of an acrylic adhesive (a triblock copolymer having the same B1-A1-B1 linkage structure as in Example 1 and polymerized so as to have a weight average molecular weight (Mw) of 47,000 and a molecular weight distribution (Mw/Mn) of 1.17) were used in place of 50 parts by mass of the triblock copolymer (LA2140e manufactured by Kuraray Co., Ltd.) in Example 1.

The adhesive layer in Comparative Example 7 was evaluated for its durability and glass adhesion by the same evaluation methods as in Example 1.

As a result, the colors of light transmitted through the adhesive layer after left for 1000 hours both in a high-temperature atmosphere (ambient temperature 80° C., relative humidity 10% or less) and in a high-temperature high-humidity atmosphere (for example, ambient temperature 60° C., relative humidity 90%) were changed, and differences Δx and Δy in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (for example, ambient temperature 60° C., relative humidity 90%) showed not less than 30 N/25 mm, and the adhesive remained on the surface of the adherend.

Comparative Example 8

The adhesive layer having optical filter functions in Comparative Example 8 was obtained in the same manner as in Example 1 except that 50 parts by mass of an acrylic adhesive (a triblock copolymer having the same B1-A1-B1 linkage structure as in Example 1 and polymerized so as to have a weight average molecular weight (Mw) of 110,000 and a molecular weight distribution (Mw/Mn) of 1.65) were used in place of 50 parts by mass of the triblock copolymer (LA2140e manufactured by Kuraray Co., Ltd.) in Example 1.

The adhesive layer in Comparative Example 8 was evaluated for its durability and glass adhesion by the same evaluation methods as in Example 1.

As a result, the colors of light transmitted through the adhesive layer after left for 1000 hours both in a high-temperature atmosphere (ambient temperature 80° C., relative humidity 10% or less) and in a high-temperature high-humidity atmosphere (for example, ambient temperature 60° C., relative humidity 90%) were changed, and differences $\Delta x$ and $\Delta y$ in chromaticity (x, y) were respectively more than 0.03.

All of the glass adhesion of the adhesive layer before and after left for 1000 hours both in a high-temperature atmosphere (ambient temperature 80° C., relative humidity 10% or less) and in a high-temperature high-humidity atmosphere (for example, ambient temperature 60° C., relative humidity 90%) showed not less than 30 N/25 mm, and the adhesive remained on the surface of the adherend.

The invention claimed is:

1. An adhesive composition for optical filter, comprising:
   a triblock copolymer wherein one polymer block (A1) comprising acrylic ester units, and two polymer blocks (B1) different in structure from the polymer block (A1) and comprising (meth)acrylic ester units, are bound to one another, or a triblock copolymer wherein two polymer blocks (A1) comprising acrylic ester units, and one polymer block (B1) different in structure from the polymer block (A1) and comprising (meth)acrylic ester units, are bound to one another, and
   a near-infrared light absorbing agent containing a diimmonium-based compound,
   wherein low-molecular-weight components in the triblock copolymer are in such an amount that both chromatic differences $\Delta x$ and $\Delta y$ of a film consisting of the adhesive composition, before and after left in an atmospheric environment at an ambient temperature of 60° C. under 95% relative humidity for 1000 hours, become 0.03 or less; wherein the triblock copolymer is represented by (B1)-(A1)-(B1).

2. The adhesive composition for optical filter according to claim 1, comprising a light absorbing agent having an absorption maximum at least at 570 to 610 nm.

3. An adhesive layer having optical filter functions, for being disposed on the front face of a display device, comprising:
   a triblock copolymer wherein one polymer block (A1) comprising acrylic ester units, and two polymer blocks (B1) different in structure from the polymer block (A1) and comprising (meth)acrylic ester units, are bound to one another, or a triblock copolymer wherein two polymer blocks (A1) comprising acrylic ester units, and one polymer block (B1) different in structure from the polymer block (A1) and comprising (meth)acrylic ester units, are bound to one another; and
   a near-infrared light absorbing agent containing a diimmonium-based compound,
   wherein low-molecular-weight components in the triblock copolymer are in such an amount that both chromatic differences $\Delta x$ and $\Delta y$ of a film consisting of the adhesive composition, before and after left in an atmospheric environment at an ambient temperature of 60° C. under 95% relative humidity for 1000 hours, become 0.03 or less; wherein the triblock copolymer is represented by (B1)-(A1)-(B1).

4. The adhesive layer having optical filter functions according to claim 3, comprising a light absorbing agent having an absorption maximum at least at 570 to 610 nm.

5. The adhesive layer having optical filter functions according to claim 3, which has a thickness of 50 to 5,000 μm and impact resistance against a breaking energy of 0.5 J or more in a falling ball impact test of dropping a steel ball with a mass of 534 g.

6. A composite filter having optical filter functions for direct attachment to a glass plate disposed on the front face of a display device, comprising the adhesive layer of claim 3 laminated with one or more functional layers having one or more functions selected from an electromagnetic wave shielding function, an antireflection function, an antiglare function, a ultraviolet absorption function and a surface protection function.

7. The composite filter according to claim 6, wherein the transmittance in the wavelength range of 800 to 1100 nm is 30% or less.

8. The composite filter according to claim 6, wherein the transmittance at the maximum absorption wavelength in the wavelength range of 560 to 630 nm is 50% or less.

9. The composite filter according to claim 6, wherein the transmittance in the visible light wavelength range of 380 to 780 nm is 20% or more.

* * * * *